US012487552B2

(12) United States Patent
Matsuda

(10) Patent No.: US 12,487,552 B2
(45) Date of Patent: Dec. 2, 2025

(54) IMAGE FORMING APPARATUS AND CARTRIDGE

(71) Applicant: CANON KABUSHIKI KAISHA, Tokyo (JP)

(72) Inventor: Kenji Matsuda, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/746,511

(22) Filed: Jun. 18, 2024

(65) Prior Publication Data

US 2025/0021044 A1 Jan. 16, 2025

(30) Foreign Application Priority Data

Jun. 20, 2023 (JP) ................................. 2023-100893

(51) Int. Cl.
*G03G 15/00* (2006.01)
*G03G 21/12* (2006.01)
*G03G 21/18* (2006.01)

(52) U.S. Cl.
CPC ......... *G03G 21/12* (2013.01); *G03G 15/6529* (2013.01); *G03G 21/18* (2013.01); *G03G 21/1821* (2013.01)

(58) Field of Classification Search
CPC ........... G03G 15/6502; G03G 15/6529; G03G 15/6555; G03G 21/12; G03G 21/16; G03G 21/18; G03G 21/1821; B65H 5/06
See application file for complete search history.

(56) References Cited

U.S. PATENT DOCUMENTS

| | | | | |
|---|---|---|---|---|
| 6,041,203 A * | 3/2000 | Suzuki | ............... | G03G 21/1821 399/113 |
| 6,415,119 B2 | 7/2002 | Nishimura et al. | | |
| 10,824,097 B2 | 11/2020 | Hatano et al. | | |
| 2010/0080610 A1* | 4/2010 | Yoshizumi | ......... | G03G 21/1821 399/119 |
| 2016/0349699 A1* | 12/2016 | Miyamoto | ......... | G03G 21/1821 |

FOREIGN PATENT DOCUMENTS

| | | |
|---|---|---|
| JP | 6-332345 A | 12/1994 |
| JP | 2001-075457 A | 3/2001 |
| JP | 2001-270631 A | 10/2001 |
| JP | 2020-052321 A | 4/2020 |
| JP | 2020-201316 A | 12/2020 |

* cited by examiner

*Primary Examiner* — Sophia S Chen
(74) *Attorney, Agent, or Firm* — Venable LLP

(57) ABSTRACT

A cartridge includes: a second conveyance roller that forms a nip with a first conveyance roller; a storage portion that stores foreign matter; and a contact member that comes into contact with the second conveyance roller for restricting leakage of the foreign matter. An apparatus main body includes a biasing member that biases the second conveyance roller toward the first conveyance roller. The second conveyance roller is at a first position at which the nip is formed with the first conveyance roller by a biasing force of the biasing member when the cartridge is attached to the apparatus main body, and is at a second position when the cartridge is detached from the apparatus main body. The contact member is in contact with the second conveyance roller when the second conveyance roller is at the first position and when the second conveyance roller is at the second position.

3 Claims, 16 Drawing Sheets

IMAGE FORMING APPARATUS AND CARTRIDGE

BACKGROUND OF THE INVENTION

Field of the Invention

The present invention relates to an image forming apparatus, and is particularly suitable for an image forming apparatus that records a developer image on a recording material such as paper, or a cartridge that is attachable to and detachable from such an image forming apparatus.

Description of the Related Art

In image forming apparatuses, a so-called electrophotographic method in which a developer is recorded on a recording material such as paper is widely used. A configuration has been proposed in which, when forming an image on a recording material such as paper, foreign matter such as dust generated from the recording material (typically, paper dust (filler, pulp, foreign matter that was originally attached, etc.) generated from recording paper serving as the recording material) is removed from the recording paper (e.g., Japanese Patent Laid-Open No. 2001-075457 and 2020-201316).

SUMMARY OF THE INVENTION

An object of the present invention is to provide a more excellent device configuration in an image forming apparatus including a foreign matter removing unit.

In order to solve the above-described problem, an image forming apparatus for forming an image on a recording material according to the present invention includes the following:

an apparatus main body having a first conveyance roller; and a cartridge that has a second conveyance roller forming a nip for conveying a recording material with the first conveyance roller, the cartridge configured to be attachable to and detachable from the apparatus main body, wherein the cartridge includes:

a holding portion configured to moveably hold the second conveyance roller in an opposing direction in which the first conveyance roller and the second conveyance roller forming the nip oppose each other;

a removal member configured to remove foreign matter from the second conveyance roller by coming into contact with the second conveyance roller;

a storage portion configured to store the foreign matter removed by the removal member; and a contact member configured to come into contact with the second conveyance roller at a position different from that of the removal member so as to restrict the foreign matter from leaking from the storage portion, wherein the apparatus main body has a biasing member configured to bias the second conveyance roller in a direction toward the first conveyance roller in a case where the cartridge is attached to the apparatus main body, wherein the second conveyance roller is at a first position at which the nip is formed by coming into contact with the first conveyance roller due to a biasing force of the biasing member in a case where the cartridge is attached to the apparatus main body, and is at a second position in a case where the cartridge is detached from the apparatus main body, and wherein the contact member is in contact with the second conveyance roller in a case where the second conveyance roller is at the first position and in a case where the second conveyance roller is at the second position.

Also, in order to solve the above problem, a cartridge that is attachable to and detachable from an apparatus main body of an image forming apparatus having a first conveyance roller according to the present invention includes the following:

a second conveyance roller configured to form a nip for conveying a recording material with the first conveyance roller;

a holding portion configured to moveably hold the second conveyance roller in an opposing direction in which the first conveyance roller and the second conveyance roller forming the nip oppose each other;

a removal member configured to remove foreign matter from the second conveyance roller by coming into contact with the second conveyance roller;

a storage portion configured to store the foreign matter removed by the removal member; and a contact member configured to come into contact with the second conveyance roller at a position different from that of the removal member so as to restrict the foreign matter from leaking from the storage portion, wherein the second conveyance roller is at a first position at which the nip is formed by coming into contact with the first conveyance roller in a case where the cartridge is attached to the apparatus main body, and is at a second position in a case where the cartridge is detached from the apparatus main body, wherein the contact member is in contact with the second conveyance roller in a case where the second conveyance roller is at the first position and in a case where the second conveyance roller is at the second position, and wherein the removal member is in contact with the second conveyance roller in a case where the second conveyance roller is at the first position, and is not in contact with the second conveyance roller in a case where the second conveyance roller is at the second position.

According to the present invention, it is possible to improve the configuration of an image forming apparatus including a foreign matter removing unit.

Further features of the present invention will become apparent from the following description of exemplary embodiments with reference to the attached drawings.

DESCRIPTION OF THE EMBODIMENTS

Embodiment 1

Hereinafter, embodiments of the invention will be described in detail based on embodiments and examples, with reference to the drawings. However, the dimensions, materials, shapes, relative arrangement, and the like of the constituent components described in this embodiment are to be modified as appropriate depending on the configuration of the device to which the invention is applied and various conditions. That is, the scope of the present invention is not intended to be limited to the following embodiments.

Figure 1:
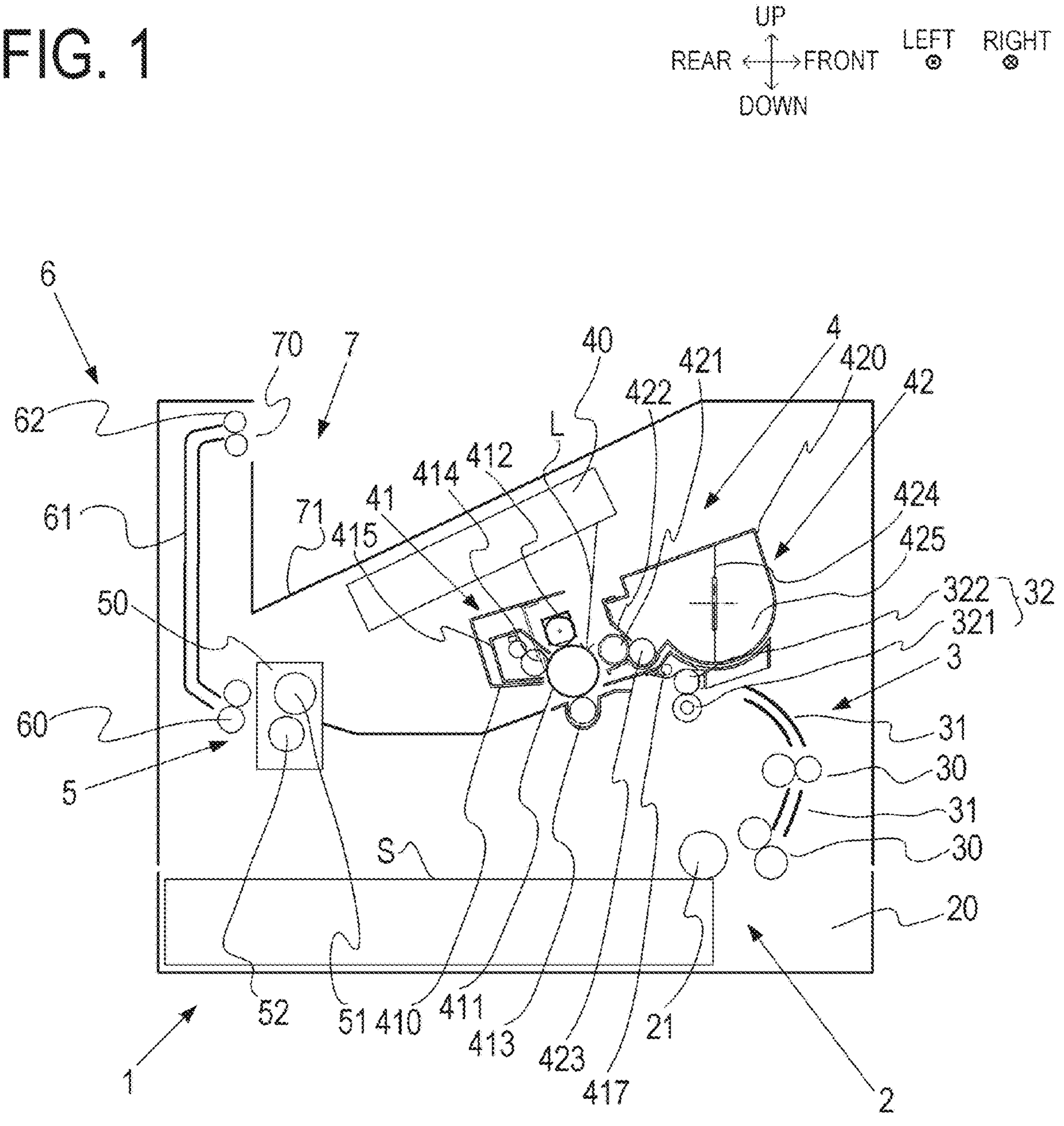
FIG. 1 is a schematic diagram of an image forming apparatus.

A schematic configuration of an image forming apparatus using electrophotography according to an embodiment of the present invention will be described with reference to FIG. 1. FIG. 1 is a schematic cross-sectional view showing a schematic configuration of an image forming apparatus. Note that FIG. 1 shows a state in which the image forming apparatus is installed on a horizontal plane as a normally assumed installation state of the image forming apparatus, and in FIG. 1, each direction on the page surface is defined as follows. An up-down direction of the page surface is the vertical direction (direction of gravity), an upward direction of the page surface is called the upward direction, and a downward direction of the page surface is called the downward direction. A leftward direction of the page surface is called the rearward direction, and a rightward direction of the page surface is called the frontward direction. Also, the frontward direction on the page surface (direction that is orthogonal to the paper surface and extends from the far side from the page surface to the near side to the page surface) is leftward, and the rearward direction (direction that is orthogonal to the page surface and extends from the near side to the page surface to the far side from the page surface) is called the rightward direction.

Here, the image forming apparatus to which the present invention is assumed to be applied is typically an image forming apparatus using an electrophotographic recording method, such as a laser printer, a copying machine, or a fax machine.

Electrophotographic Image Forming Apparatus

As shown in FIG. 1, an image forming portion 4 is arranged at the center of an apparatus main body 1 of the image forming apparatus. Also, a paper feeding portion 2 is arranged below the image forming portion 4, and a conveying portion 3 is arranged frontward of the paper feeding portion 2. Furthermore, a fixing portion 5 is arranged rearward of the image forming portion 4. A paper discharge portion 6 is arranged rearward of the fixing portion 5. Also, a stacking portion 7 is arranged above the image forming portion 4.

The paper feeding portion 2 conveys a recording material S to the image forming portion 4 via the conveying portion 3. An image is formed on the conveyed recording material S in the image forming portion 4, and then the recording material S is conveyed to the fixing portion 5. The image formed on the recording material S is fixed onto the recording material S by the fixing portion 5. The recording material S with the image fixed thereon is discharged from the paper discharge portion 6 to the outside of the apparatus main body, and is stacked in the stacking portion 7.

Paper Feeding Portion and Conveying Portion

The paper feeding portion 2 is constituted by a cassette portion 20 in which the recording materials S are stacked and stored, and a pickup portion 21 that conveys the stacked and stored recording materials S one by one to the image forming portion 4.

The conveying portion 3 is constituted by an upstream conveyance roller pair 30 that conveys the recording material S to the image forming portion 4, a conveyance guide 31 that restricts the movement path of the recording material S, and a downstream conveyance roller portion 32 that conveys the recording material S to the image forming portion 4. The downstream conveyance roller portion 32 is located upstream of the image forming portion 4 on the conveyance path of the recording material S, and is constituted by a first conveyance roller 321 and a second conveyance roller 322. The first conveyance roller 321 is rotatably supported by the apparatus main body 1, and is rotated by being driven by a drive transmission unit (not shown). The first conveyance roller 321 comes into contact with a back surface of the recording material S on a side opposite to an image forming surface during an image forming operation. The second conveyance roller 322 is rotatably supported by a drum cartridge 41 and comes into contact with the image forming surface of the recording material S during the image forming operation.

The pickup portion 21 operates in accordance with the image forming operation, feeds the recording materials S in the cassette portion 20 one by one, and conveys the recording materials S to the conveying portion 3.

The upstream conveyance roller pair 30 is driven by a driving force transmitted by a driving unit (not shown). The recording material S is sandwiched by the upstream conveyance roller pair 30 and conveyed along the conveyance guide 31. The first conveyance roller 321 is constituted by a metal shaft and a rubber roller. During the image forming operation, the first conveyance roller 321 of the downstream conveyance roller portion 32 is driven by a drive transmission unit (not shown), and conveys the recording material S to the image forming portion 4.

Also, during the image forming operation, the first conveyance roller 321 of the downstream conveyance roller portion 32 can perform an operation of keeping the recording material S stationary and waiting, and an operation of conveying the recording material S to the image forming portion 4, in a predetermined sequence. Through this operation, the developer image and the recording material S are positionally aligned in the image forming step, which is the next step.

The recording material S is reliably conveyed to the image forming portion 4 due to the frictional force of the rubber roller portion of the first conveyance roller 321. In this embodiment, the second conveyance roller 322 is configured to be rotated by the first conveyance roller 321. However, the second conveyance roller 322 may also be configured to be rotationally driven by drive transmission (not shown).

Image Forming Portion

The image forming portion 4 includes a laser scanner unit 40 that is a latent image forming unit, the drum cartridge 41, and a developing cartridge 42.

The drum cartridge 41 is constituted by a photosensitive drum 411, a charging portion 412, a transfer roller 413, a cleaning portion 414, and a collection portion 415. The photosensitive drum 411 is an image bearing member that bears a developer image. The charging portion 412 is a charging unit that performs charging processing on the photosensitive drum 411. The cleaning portion 414 is a cleaning member for cleaning paper dust and the like attached to the photosensitive drum 411. The collection portion 415 is a collection unit for collecting paper dust and the like cleaned by the cleaning member.

The developing cartridge 42 includes a developing roller 421, a developing blade 422, a supply roller 423, a conveyance paddle 424, and a developer storage portion 425. The developing roller 421 is a developer bearing member that bears developer. The developing blade 422 is a developer regulating member that regulates the layer thickness of the developer borne by the developing roller 421. The supply roller 423 is a developer supply member that supplies developer to the developing roller 421. The conveyance paddle 424 is a developer conveying portion (conveying member) for conveying developer to the supply roller 423. The developer storage portion 425 is a developer storing unit for storing developer.

The laser scanner unit 40 irradiates the photosensitive drum 411 with latent image light L obtained by processing image information with a processing unit (not shown). A predetermined bias is applied to the charging portion 412 by a bias applying unit (not shown), and the surface of the photosensitive drum 411 is charged. An electrostatic latent image is formed on the surface of the photosensitive drum 411 by the latent image light L. The developer stored in the developer storage portion 425 is conveyed to the supply roller 423 by the conveyance paddle 424. The conveyed developer is supplied to the developing roller 421 by the supply roller 423. The layer thickness of the developer supplied to the developing roller 421 is regulated by the developing blade 422, and an electric charge is applied by frictional charging. A predetermined bias is applied to the developing roller 421 by a bias applying unit (not shown). The developer borne on the developing roller 421 is developed on the electrostatic latent image by the applied bias and the potential difference of the electrostatic latent image formed on the photosensitive drum 411. In this way, a developer image is borne on the photosensitive drum 411. Here, the recording material S conveyed by the conveying portion 3 is conveyed to a nip portion between the photosensitive drum 411 and the transfer roller 413. A predetermined bias is applied to the transfer roller 413 by a bias applying unit (not shown). The developer image borne on the photosensitive drum 411 is transferred onto the recording material S by the potential difference of the bias applied to the transfer roller 413.

Foreign matter such as paper dust that has moved from the recording material S to the photosensitive drum 411 is scraped off from the surface of the photosensitive drum 411 by the cleaning portion 414 and collected by the collection portion 415.

Fixing Portion

The fixing portion 5 includes a fixing frame 50, a heating roller 51, and a pressure roller 52. A fixing frame 50 rotatably supports the heating roller 51 and the pressure roller 52. The heating roller 51 includes a heating unit (not shown), and the heating roller 51 is heated by this. The pressure roller 52 is pressed toward the heating roller 51 by a pressure unit (not shown). Also, the heating roller 51 and the pressure roller 52 are driven by a driving unit (not shown). The recording material S that has a developer image formed on its surface and was conveyed from the image forming portion 4 is sandwiched by a nip portion between the heating roller 51 and the pressure roller 52. Here, the developer image is fixed onto the recording material S by being heated and pressed.

Paper Discharge Portion, Stacking Portion

The paper discharge portion 6 is constituted by a paper discharge conveyance roller pair 60, a paper discharge conveyance guide 61, and a paper discharge roller pair 62. The stacking portion 7 includes a paper discharge opening 70 and a paper discharge tray 71. The paper discharge conveyance roller pair 60 and the paper discharge roller pair 62 are driven by a driving unit (not shown). The recording material S onto which the developer image has been fixed by the fixing portion 5 passes through the paper discharge conveyance guide 61 by the paper discharge conveyance roller pair 60, is discharged from the paper discharge opening 70 by the paper discharge roller pair 62, and is stacked in the paper discharge tray 71.

Example 1

An image forming apparatus according to Example 1, which is a first aspect of the invention, will be described with reference to FIGS. 1 to 11. However, the scope of the invention is not intended to be limited to only the shapes of the constituent components, their relative arrangement, and the like described in this example, unless specifically stated otherwise.

Attachment and Detachment of Drum Cartridge and Developing Cartridge

Attachment and detachment of the drum cartridge 41 and developing cartridge 42 in this embodiment will be described with reference to FIGS. 1, 2, 3, 4A, 4B, 5, 6A and 6B.

As shown in FIG. 1, the drum cartridge 41 and the developing cartridge 42 are each formed into a unit. These units can be easily replaced when each reaches a predetermined lifespan. Also, during image formation, if the recording material S piles up inside the apparatus main body 1 (a so-called jam), the drum cartridge 41 and the developing cartridge 42 are detached from the apparatus main body, and the piled-up recording material S is removed.

Figure 2:
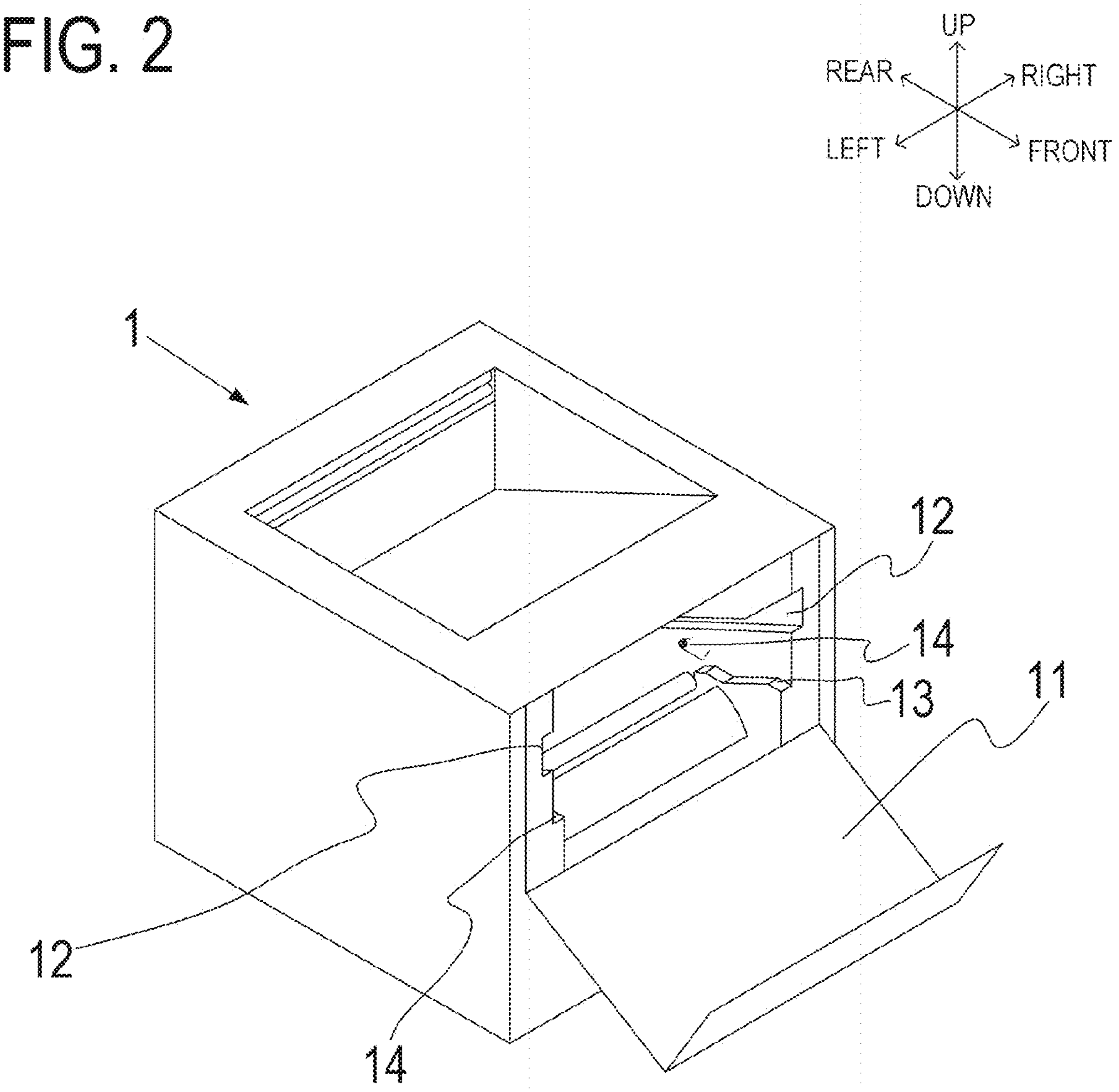
FIG. 2 is a perspective view of an apparatus main body.

FIG. 2 is a perspective view of the apparatus main body 1 in this example. As shown in FIG. 2, a cartridge door 11 and a cartridge guide 12 are provided on the front side of the apparatus main body 1. The cartridge door 11 is supported by the apparatus main body 1 so as to be openable and closable. In FIG. 2, the cartridge door 11 is shown in an open state. The cartridge guide 12 is a guiding portion for restricting the movement path when the drum cartridge 41 is attached to and detached from the apparatus main body 1. The cartridge guide 12 has a groove-like shape formed on the inner wall of the apparatus main body 1 so as to be bilaterally symmetrical.

Figure 3:
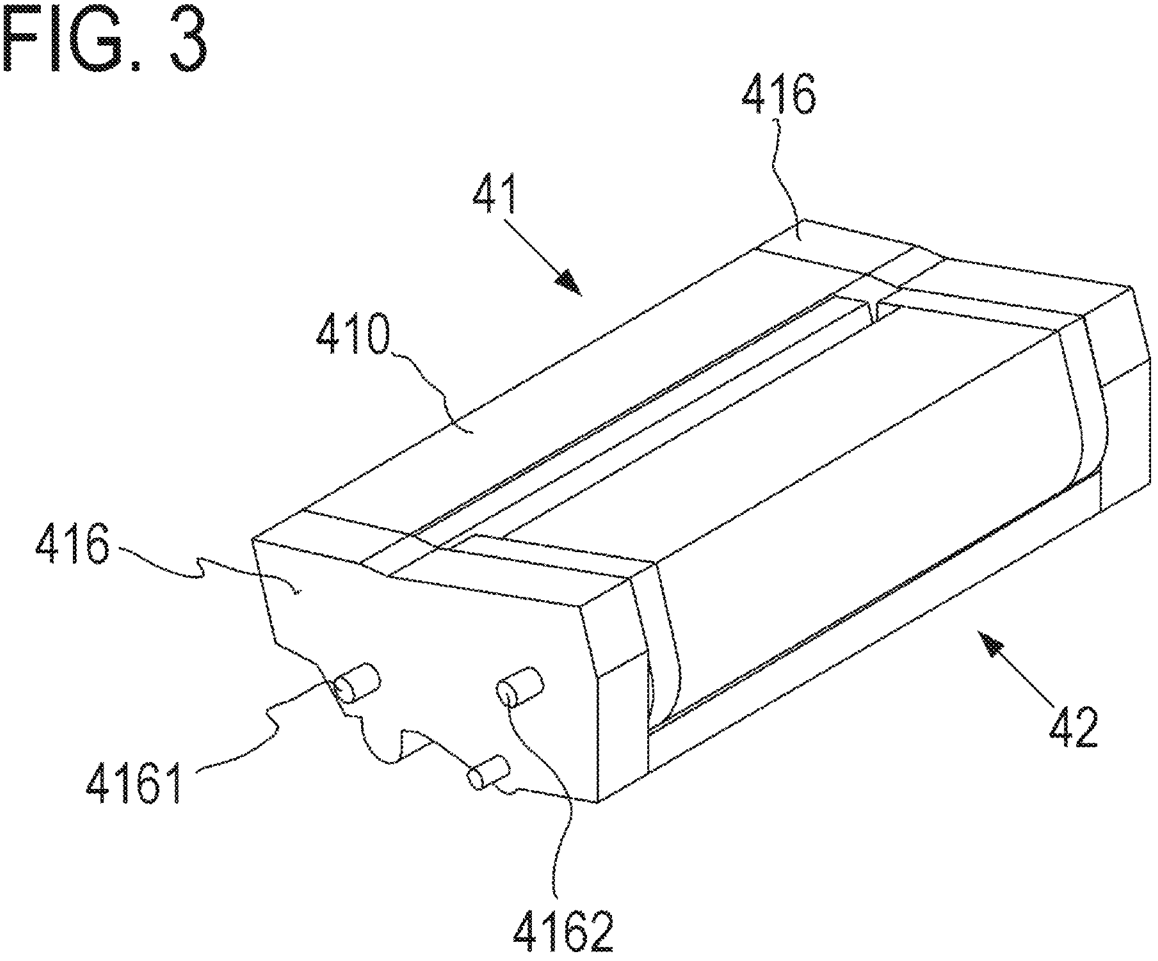
FIG. 3 is a perspective view of a drum cartridge and a developing cartridge.

FIG. 3 is a perspective view of the drum cartridge 41 and developing cartridge 42 in this embodiment. In FIG. 3, the developing cartridge 42 is shown combined with the drum cartridge 41. As shown in FIG. 3, the drum cartridge 41 and the developing cartridge 42 can be attached to and detached from the apparatus main body 1 as a cartridge unit, in a mutually combined state. The drum cartridge 41 includes a drum cartridge frame (drum frame) 410, drum side covers 416, a drum cartridge boss 4161, and a drum cartridge rotation stopping boss 4162. The drum cartridge frame 410 is a frame in which the photosensitive drum 411, the charging portion 412, the transfer roller 413, the cleaning portion 414, the collection portion 415, and a downstream conveyed paper dust collection portion 417 shown in FIG. 1 are integrally attached to each other. Also, the drum side covers 416 are attached to both the left and right ends of the drum cartridge frame 410. The drum cartridge boss 4161 and the drum cartridge rotation stopping boss 4162 have a cylindrical shape that protrudes from the side surface of the drum side cover 416. The protruding direction of the drum cartridge boss 4161 and the drum cartridge rotation stopping boss 4162 is parallel to the longitudinal direction of the drum cartridge 41 or the rotational axis of the photosensitive drum 411, and is orthogonal to the direction in which the drum cartridge 41 is inserted into and detached from the apparatus main body 1. The drum cartridge boss 4161 and the drum cartridge rotation stopping boss 4162 are guided by engaging with the cartridge guide 12 when the drum cartridge 41 is inserted or detached.

Figure 4A:
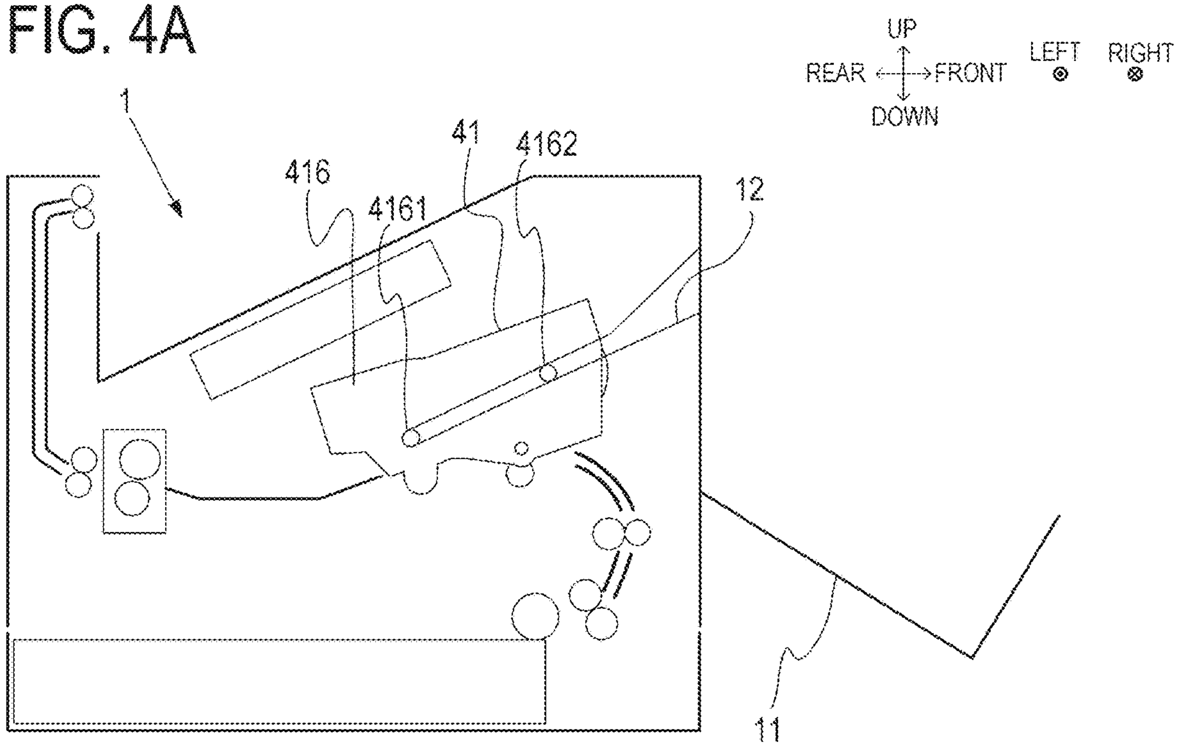
FIGS. 4A and 4B are schematic diagrams showing how the drum cartridge is attached to and detached from the apparatus main body.
Figure 4B:
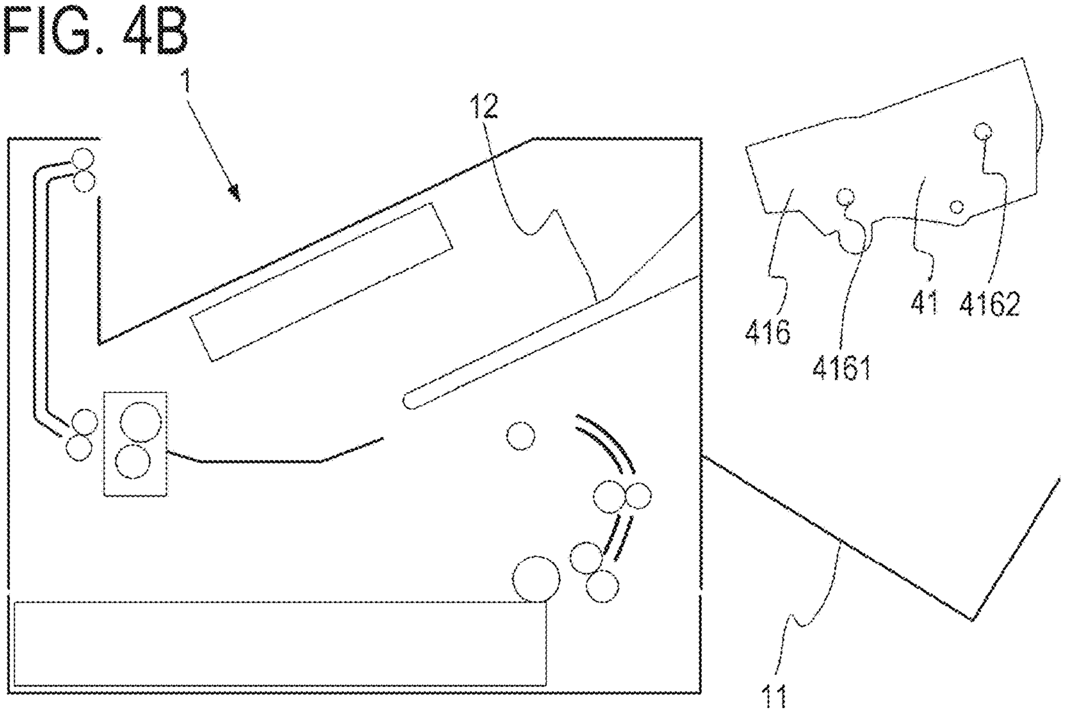

A method for attaching and detaching the drum cartridge 41 to and from the apparatus main body 1 will be described with reference to FIGS. 4A and 4B. FIGS. 4A and 4B are schematic cross-sectional views showing how the drum cartridge 41 is attached to and detached from the apparatus main body 1. Furthermore, FIG. 4A shows a state in which the drum cartridge 41 is attached to an inside of the apparatus main body 1 and the cartridge door 11 is open. FIG. 4B shows a state in which the drum cartridge 41 is detached from the apparatus main body 1 and the cartridge door 11 is open.

The cartridge guide 12 is a guiding portion for guiding the drum cartridge 41 to a predetermined position in the apparatus main body 1 when the drum cartridge 41 is attached to the apparatus main body 1. At the same time, the cartridge guide 12 also serves as a positioning portion for positioning the drum cartridge 41 at a predetermined position in the apparatus main body 1 by engaging with the drum cartridge boss 4161. As shown in FIG. 4A, the drum cartridge 41 is attached to the inside of the apparatus main body 1. At this time, the cartridge guide 12 and the drum cartridge boss 4161 are engaged with each other. Furthermore, the cartridge guide 12 and the drum cartridge rotation stopping boss 4162 are also engaged with each other. That is, the drum cartridge 41 is positioned at a predetermined position when the drum cartridge boss 4161 and the drum cartridge rotation stopping boss 4162 formed on the left and right sides of the drum cartridge 41 engage with the cartridge guide 12. Note that the drum cartridge rotation stopping boss 4162 may also be arranged only on either the left or right side. On the other hand, by providing the drum cartridge rotation stopping boss 4162 on both the left and right sides, the stability of the insertion operation of the drum cartridge 41 is improved.

The cartridge door 11 is opened when the drum cartridge 41 is attached or detached. Then, when the drum cartridge 41 is attached and image formation is performed, the cartridge door 11 is closed. In this embodiment, the cartridge door 11 is configured to swing open and closed using a swing center as a reference. Other configurations may also be used to open the inside of the apparatus main body 1.

When detaching the drum cartridge 41 from the apparatus main body 1, the user grasps the drum cartridge 41 and moves the drum cartridge 41 frontward. At this time, the drum cartridge boss 4161 and the drum cartridge rotation stopping boss 4162 move while maintaining engagement with the cartridge guide 12. This makes it possible to restrict the movement path of the drum cartridge 41 with respect to the apparatus main body 1.

When inserting the drum cartridge 41 into the apparatus main body 1, the opposite operation to the detachment operation is performed. As shown in FIG. 4B, the vertical width of the cartridge guide 12 is wider on the front side. The user aligns the drum cartridge boss 4161 with the cartridge guide 12 and inserts the drum cartridge boss 4161. When attaching is complete, the user closes the cartridge door 11, thereby completing the insertion operation and putting the image forming apparatus in a state in which an image forming operation is possible.

Figure 5:
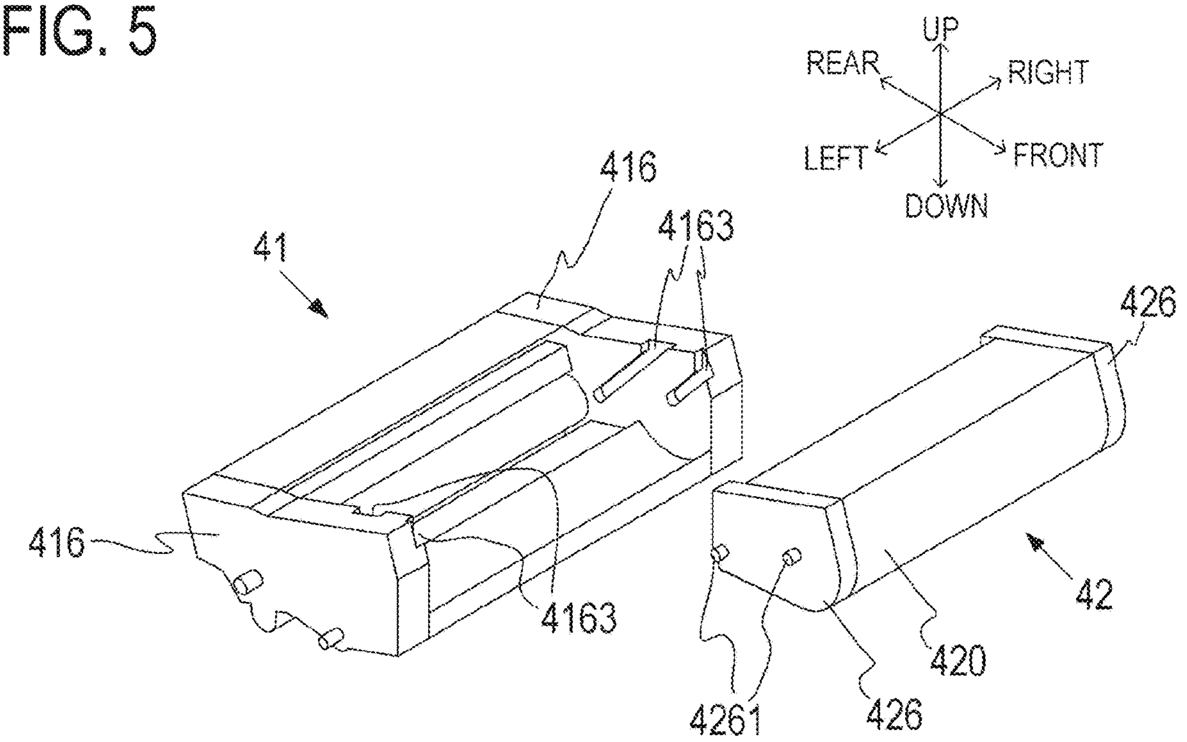
FIG. 5 is a perspective view of the drum cartridge and the developing cartridge in a separated state.
Figure 6A:
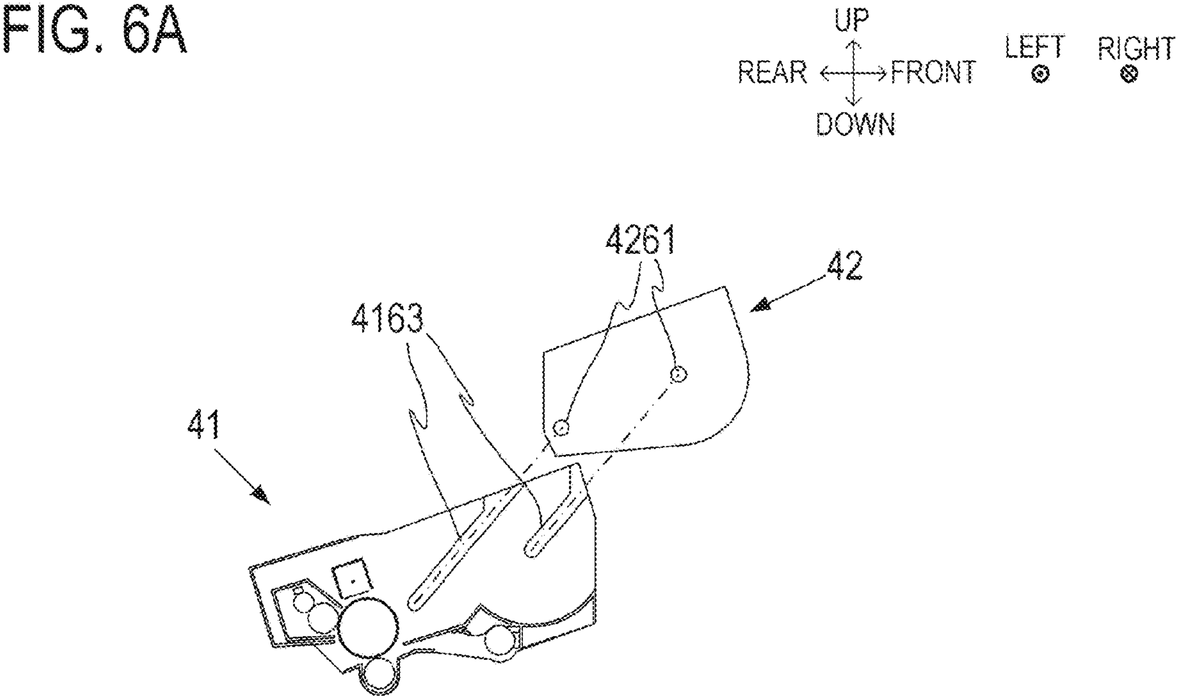
FIGS. 6A and 6B are schematic diagrams showing combination and separation of the drum cartridge and the developing cartridge.
Figure 6B:
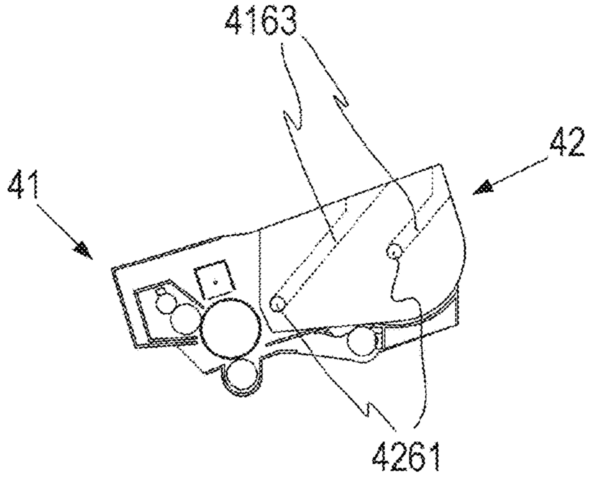

The combination and separation of the drum cartridge 41 and the developing cartridge 42 will be described with reference to FIGS. 5, 6A, and 6B. FIG. 5 is a schematic perspective view showing a state in which the drum cartridge 41 and the developing cartridge 42 are separated from each other. FIGS. 6A and 6B are schematic side views showing the combination and separation of the drum cartridge 41 and the developing cartridge 42. FIG. 6A shows a state in which the drum cartridge 41 and the developing cartridge 42 are separated from each other. FIG. 6B shows a state in which the drum cartridge 41 and the developing cartridge 42 are combined with each other.

As shown in FIG. 5, developing cartridge guides 4163 are formed on the inner wall of the drum side cover 416. Also, the developing cartridge 42 includes a developing cartridge frame (developing frame) 420 and developing side covers 426 attached to both left and right ends of the developing cartridge frame 420. Furthermore, developing cartridge guide pins 4261 are formed on the developer side covers 426.

The developing cartridge guides 4163 are two grooves formed in the drum side cover 416. The developing cartridge guides 4163 are formed on the inner side surfaces of the left and right drum side covers 416 that oppose each other in the longitudinal direction of the drum cartridge 41 (rotation axis of the photosensitive drum 411). As shown in FIG. 1, the developing cartridge frame 420 is a frame for integrally attaching the developing roller 421, the developing blade 422, the supply roller 423, the conveyance paddle 424, and the developer storage portion 425.

The procedure for combining the developing cartridge 42 with the drum cartridge 41 will be described with reference to FIGS. 6A and 6B. As shown in FIG. 6A, the two (pair of) developing cartridge guide pins 4261 are aligned with the two (pair of) developing cartridge guides 4163, and the drum cartridge 41 and the developing cartridge 42 are moved relative to each other. Due to the developing cartridge guide pins 4261 engaging with the developing cartridge guides 4163, the developing cartridge 42 moves relative to the drum cartridge 41 along the dashed line in FIG. 6A. Then, as shown in FIG. 6B, when the developing cartridge guide pins 4261 reach the dead ends (the deepest part) of the developing cartridge guides 4163, the combination of the drum cartridge 41 and the developing cartridge 42 is complete.

The developing cartridge 42 can be detached from the apparatus main body 1 while maintaining the state of combination with the drum cartridge 41, and thereafter be separated from the drum cartridge 41 and replaced. It is also possible to separate the developing cartridge 42 and replace the developing cartridge 42 while the drum cartridge 41 is attached to the apparatus main body 1.

Movement Path of Second Conveyance Roller when Attaching and Detaching Drum Cartridge The movement path of the second conveyance roller 322 when the drum cartridge 41 is attached and detached will be described with reference to FIG. 2 and FIGS. 7A to 8D.

As shown in FIG. 2, a second conveyance roller guide 13 and a second conveyance roller pressure spring 14 are arranged inside the apparatus main body 1. The second conveyance roller guide 13 restricts the movement path for when the second conveyance roller 322 moves inside the apparatus main body 1. The second conveyance roller pressure spring 14 serving as a biasing member presses the second conveyance roller 322 toward the first conveyance roller 321 when the drum cartridge 41 is attached to the apparatus main body 1. FIG. 2 shows a second conveyance roller guide 13 and a second conveyance roller pressure spring 14, which are arranged on the right inner wall of the apparatus main body 1. Similarly, a second conveyance roller guide 13 and a second conveyance roller pressure spring 14 are arranged on the left inner wall as well.

Figure 7A:
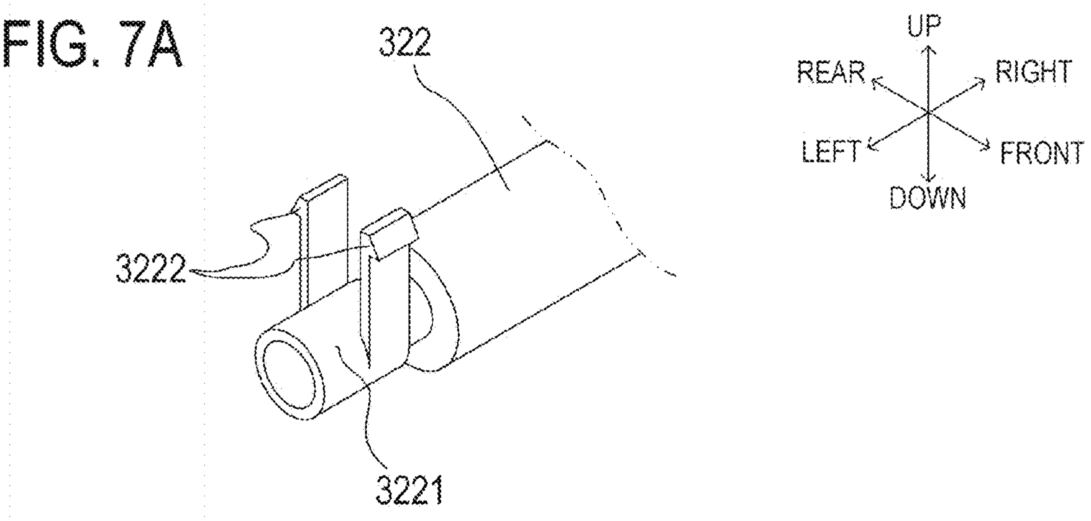
FIGS. 7A and 7B are partially enlarged perspective views showing a left end of a second conveyance roller and the surrounding area thereof.
Figure 7B:
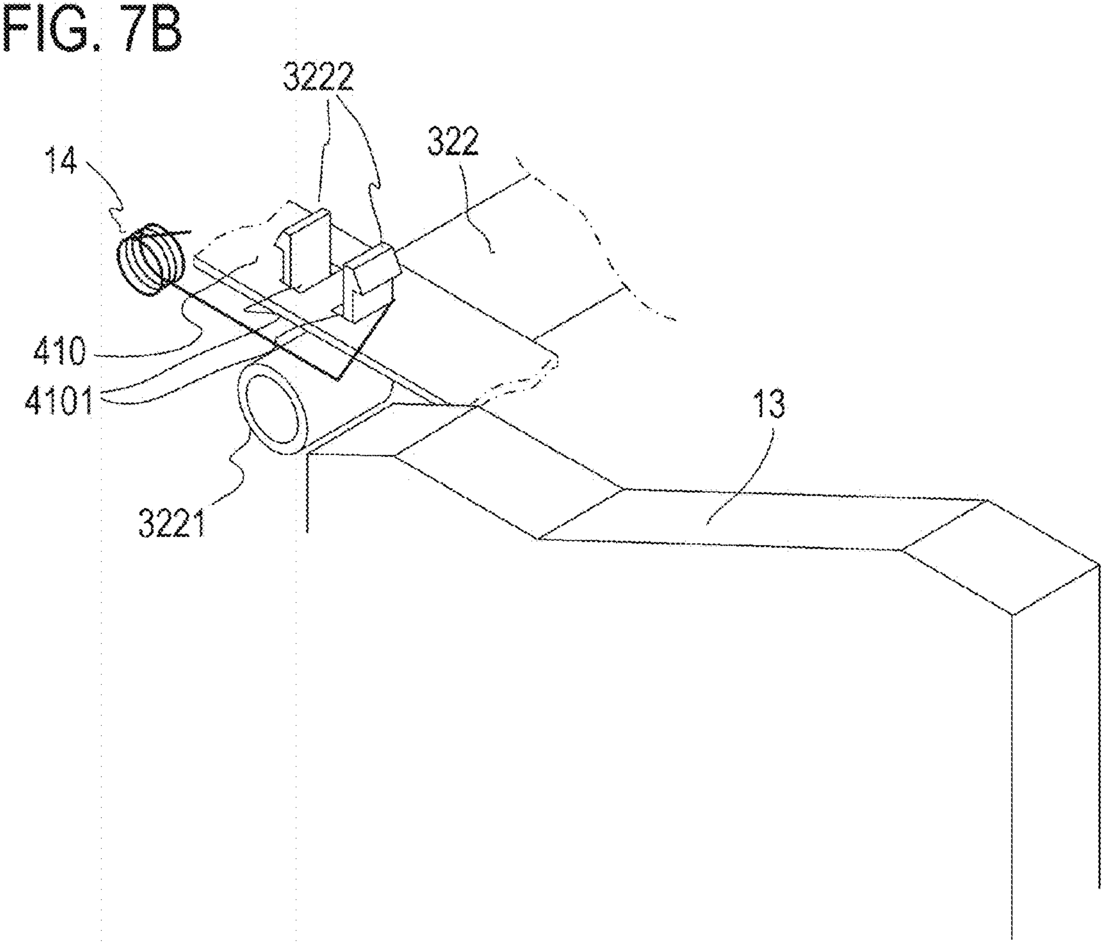

FIGS. 7A and 7B are partially enlarged perspective views showing the left end portion of the second conveyance roller 322 and the surrounding area thereof. Also, FIG. 7A shows a state in which the left end portion of the second conveyance roller 322 is rotatably supported by the driven roller bearing 3221. Furthermore, FIG. 7B shows a state when the drum cartridge 41 is attached to the apparatus main body 1 and the second conveyance roller 322 is incorporated in the apparatus main body 1. The state shown in FIG. 7B corresponds to the state shown in FIG. 4A when the drum cartridge bosses 4161 reach the dead ends (deepest parts) of the cartridge guides 12. Note that the right end portion of the second conveyance roller 322 and the surrounding area thereof are similarly configured, although this is not shown in the drawings.

As shown in FIG. 7A, locking hook portions 3222 serving as locking portions are formed in the driven roller bearing 3221, and form a holding portion for holding the second conveyance roller 322 together with the locking hook receiving holes 4101 of the drum cartridge frame 410 serving as locked portions. The second conveyance roller 322 is held moveably in the direction opposing the first conveyance roller 321 with respect to the drum cartridge frame 410 by this holding portion. In a state where no external force is applied to the second conveyance roller 322, the second conveyance roller 322 is held by its own weight at the second position where the locking hook portion 3222 and the locking hook receiving hole 4101 are locked to each other. The driven roller bearing 3221 rotatably supports the second conveyance roller 322, and therefore a material with high slidability can be selected. An elastic material can be selected for the locking hook portions 3222 so that they can be bent during the assembly task. Examples of materials with high slidability and elasticity include polyacetal, polycarbonate, and the like. Also, if it is necessary to apply a bias to the second conveyance roller 322, a material having conductivity, slidability, and elasticity is selected. As such a material, conductive polyacetal or the like can be selected.

That is, it can be said that the holding portion in the present invention includes a bearing provided at the end portion of the second conveyance roller, a locking portion provided on the bearing, and a locked portion provided on the frame of the cartridge. Also, the second position of the second conveyance roller when the cartridge is detached from the apparatus main body can be said to be a position where the locking portion and the locked portion are locked. Also, it can be said that the holding portion holds the second conveyance roller such that it can be moved to the second position by its own weight.

As shown in FIG. 7B, the locking hook portions 3222 are locked in the locking hook receiving holes 4101 formed in the drum cartridge frame 410. The locking hook portions 3222 and the locking hook receiving holes 4101 are engaged with each other to restrict relative movement between the driven roller bearing 3221 (second conveyance roller 322) and the drum cartridge frame 410 (drum cartridge 41) in the front-rear and left-right directions. Also, the locking hook portions 3222 and the locking hook receiving hole 4101 are configured to restrict the relative movement of the driven roller bearing 3221 (second conveyance roller 322) and the drum cartridge frame 410 (drum cartridge 41) in the up-down direction to a predetermined range. Also, the apparatus main body 1 is provided with the second conveyance roller pressure springs 14, and when the drum cartridge 41 is attached to the apparatus main body 1, the driven roller bearing 3221 is pressed by the second conveyance roller pressure springs 14. The second conveyance roller pressure springs 14 bias the driven roller bearing 3221 so as to move the second conveyance roller 322 in the direction opposite to the direction of moving away from the second position where the locking hook portions 3222 and the locking hook receiving holes 4101 are locked to each other, that is, the direction toward the second position. The second conveyance roller 322, which has received the biasing force of the second conveyance roller pressure springs 14, comes into contact with the first conveyance roller 321 before reaching the second position. This position is the first position. The second conveyance roller pressure spring 14 presses the driven roller bearing 3221 so as to press the second conveyance roller 322 with a predetermined pressure against the first conveyance roller 321 provided in the apparatus main body 1. At this time, the locking hook portions 3222 and the locking hook receiving holes 4101 are spaced apart from each other (in a non-locking state in which the up-down movement of the driven roller bearing 3221 with respect to the drum cartridge frame 410 is not restricted).

That is, it can be said that the holding portion in the present invention performs holding such that the second conveyance roller can move in the direction of moving away from the second position in the direction in which the first conveyance roller and the second conveyance roller oppose each other by coming into contact with the first conveyance roller. Also, it can be said that the biasing member applies a biasing force to the bearing so as to move the second conveyance roller in the opposite direction to the above-mentioned direction of moving away when the cartridge is attached to the apparatus main body. Also, it can be said that the second conveyance roller is maintained at the first position by the biasing force that the bearing receives from the biasing member while the cartridge is being attached in the apparatus main body.

FIGS. 8A to 8D are partially enlarged schematic diagrams showing the movement path of the driven roller bearing 3221 when the drum cartridge 41 is attached to the apparatus main body 1. The state in which the drum cartridge 41 gradually moves toward the rear inside the apparatus main body 1 is shown in the order of FIG. 8A, FIG. 8B, FIG. 8C, and FIG. 8D.

Figures 8A, 8B, 8C, 8D:
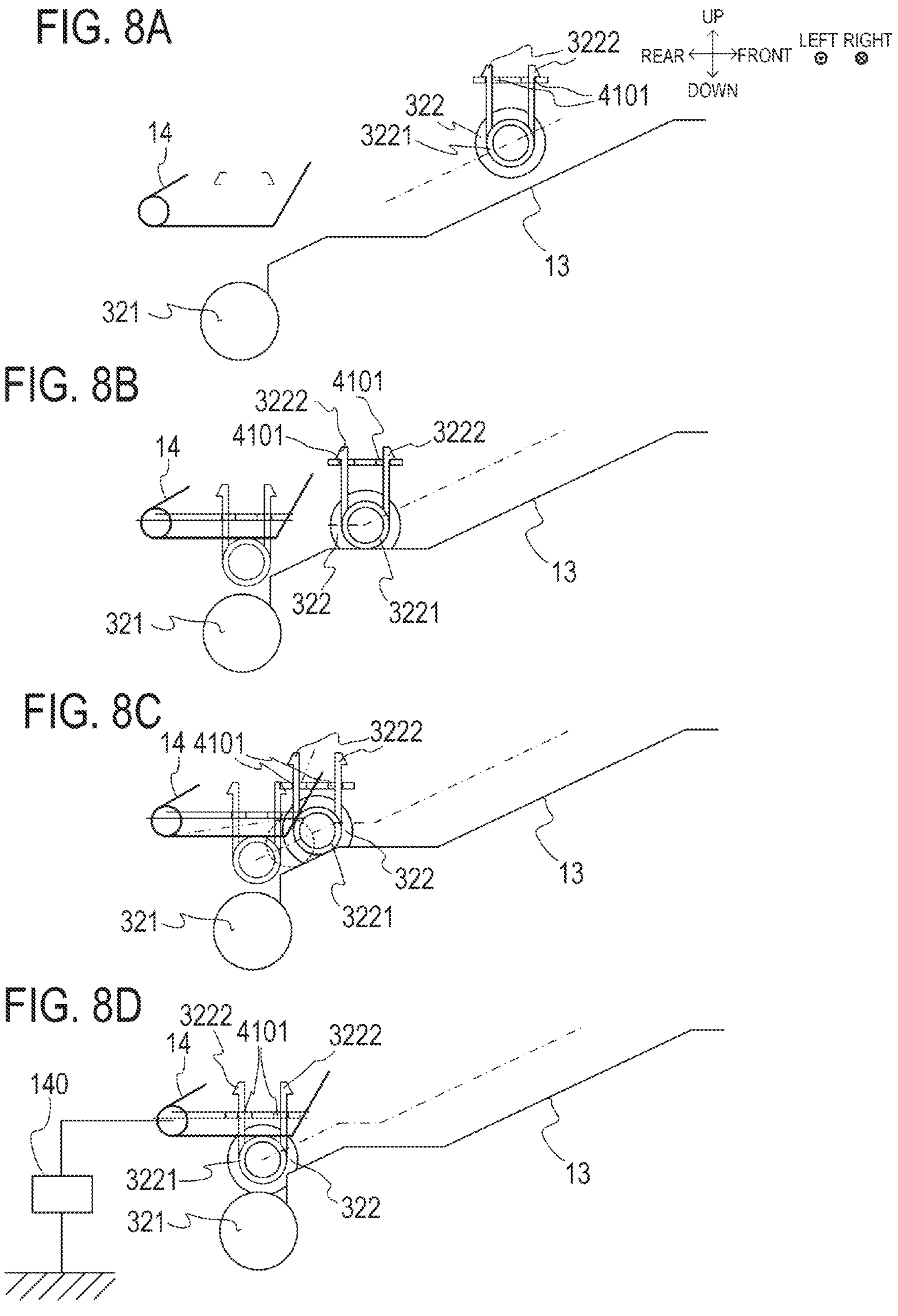
FIGS. 8A to 8D are partially enlarged schematic diagrams showing a movement path of a first conveyance roller bearing.

As shown in FIG. 8A, when the drum cartridge 41 is attached to the apparatus main body 1, as described above (as shown in FIG. 4A and FIG. 4B), the movement path of the drum cartridge 41 is restricted by the cartridge guide 12. At this time, as shown in FIG. 8A, the locking hook portions 3222 and the locking hook receiving holes 4101 are in contact with each other (the locking hook portions 3222 are locked to the edges of the locking hook receiving holes 4101 and the second conveyance roller 322 is suspended from the drum cartridge frame 410). Note that the one-dot chain line in FIG. 8A indicates the movement path of the second conveyance roller 322 in FIG. 8A.

As shown in FIG. 8B, as the insertion operation of the drum cartridge 41 continues, the second conveyance roller guide 13 and the driven roller bearing 3221 engage with each other (the driven roller bearing 3221 engages with the second conveyance roller guide 13). When the insertion operation advances further, the movement path of the driven roller bearing 3221 is restricted by the second conveyance roller guide 13 (the driven roller bearing 3221 moves while sliding on the second conveyance roller guide 13). That is, as shown in FIG. 8B, the locking hook portion 3222 moves away from the locking hook receiving hole 4101 (enters a non-locked state in which the second conveyance roller 322 is released from being suspended from the drum cartridge frame 410).

As shown in FIG. 8C, when the insertion operation continues, the driven roller bearing 3221 whose movement path is restricted by the second conveyance roller guide 13 engages with the second conveyance roller pressure spring 14 (receives the biasing force of the second conveyance roller pressure spring 14). Since the movement path of the driven roller bearing 3221 is restricted by the second conveyance roller guide 13, the driven roller bearing 3221 continues to move against the biasing force of the second conveyance roller pressure spring 14, and as indicated by the two-dot chain line in FIG. 8C, pushes up the second conveyance roller pressure spring 14.

As shown in FIG. 8D, when the drum cartridge 41 is positioned at a predetermined position, the movement path of the second conveyance roller 322 becomes like the one-dot chain line in FIG. 8D. At this time, the second conveyance roller 322 is no longer restricted by the second conveyance roller guide 13, and is pressed toward the first conveyance roller 321 by the biasing force of the second conveyance roller pressure spring 14. Also, the locking hook portions 3222 are maintained in a state of being spaced apart from the locking hook receiving holes 4101 (an unlocked state in which the second conveyance roller 322 is released from being suspended from the drum cartridge frame 410).

The movement path of the second conveyance roller 322 when the drum cartridge 41 is attached has been described above with reference to FIGS. 8A to 8D. When detaching the drum cartridge 41 from the apparatus main body 1, the second conveyance roller 322 moves in the order of FIG. 8D, FIG. 8C, FIG. 8B, and FIG. 8A. That is, by moving the drum cartridge 41 diagonally frontward and upward from the state shown in FIG. 8D, which shows the state of being completely attached to the apparatus main body 1, it is possible to return to the states shown in FIGS. 8C, 8B, and 8A.

As described above, when the drum cartridge 41 is attached to the apparatus main body 1, the second conveyance roller 322 is moveable in the up-down direction inside the drum cartridge frame 410. That is, the locking hook portion 3222 and the locking hook receiving hole 4101 are engaged with each other so as to allow relative movement between the second conveyance roller 322 (driven roller bearing 3221) and the drum cartridge 41 (drum cartridge frame 410) in the up-down direction within a predetermined range. With this configuration, when the drum cartridge 41 is attached to and detached from the apparatus main body, the second conveyance roller 322 does not interfere with the attachment and detachment operation.

Also, by including the second conveyance roller pressure spring 14 in the apparatus main body 1, that is, by providing a part of the configuration for positioning the second conveyance roller 322 in the apparatus main body 1, it is possible to reduce the cost of the drum cartridge 41. That is, the positioning of the second conveyance roller 322 with respect to the first conveyance roller 321 in the front-rear direction and left-right direction when the drum cartridge 41 is attached to the apparatus main body 1 is performed by the engagement between the locking hook portion 3222 and the locking hook receiving hole 4101. Also, the positioning of the second conveyance roller 322 with respect to the first conveyance roller 321 in the up-down direction when the drum cartridge 41 is attached to the apparatus main body 1 is performed by the biasing of the second conveyance roller pressure springs 14. Among these positioning units, the second conveyance roller pressure spring 14 is provided in the apparatus main body 1. As described above, the drum cartridge 41 is a unit that is replaced when it reaches a predetermined lifespan. Compared to the product lifespan of the apparatus main body 1, the lifespan of the drum cartridge 41 is short. By reducing the cost of the drum cartridge 41, cost reduction is effective when considering the total cost up to the end of the product lifespan.

Paper Dust Collection Configuration

Figure 9:
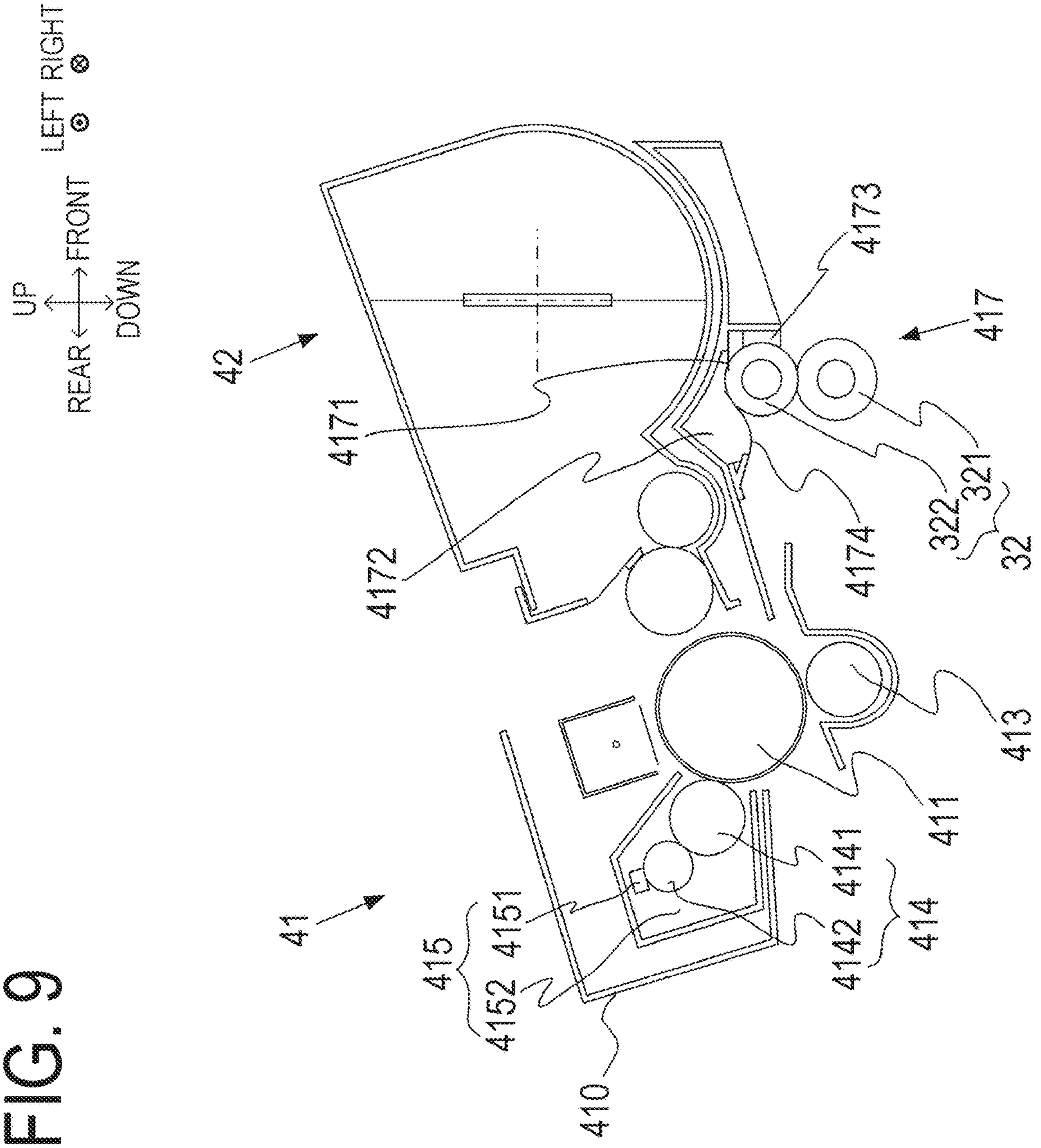
FIG. 9 is a partial cross-sectional view of the conveyance roller, the drum cartridge, and the developing cartridge.

The paper dust collection configuration will be described with reference to FIG. 9. FIG. 9 is a partial schematic view of the first conveyance roller 321, the drum cartridge 41, and the developing cartridge 42.

Here, the paper dust includes filler contained in the recording material S, pulp, foreign matter that was originally attached, and the like. Also, although a paper dust collection configuration will be described here as a typical example of a foreign matter collection configuration, the object to be collected by the foreign matter collection configuration is not limited to paper dust.

As shown in FIG. 9, the cleaning portion 414, the collection portion 415, and the downstream conveyed paper dust collection portion 417 are incorporated in the drum cartridge frame 410. The cleaning portion 414 is constituted by a cleaning roller 4141 and a separation roller 4142. The collection portion 415 is constituted by a collection pad 4151 and a collection container 4152. Also, the downstream conveyed paper dust collection portion 417 is constituted by a conveyance collection scraper 4171, a conveyed paper dust storage portion 4172, a front contact member 4173, and a rear contact member 4174.

Collection of Paper Dust from Photosensitive Drum

Collection of paper dust attached to the photosensitive drum 411 will be described with reference to FIG. 9. As described in “Image Forming Portion” above, the recording material S is held at the nip portion between the photosensitive drum 411 and the transfer roller 413 when the developer image formed on the photosensitive drum 411 is transferred. At this time, some of the paper dust attached to the recording material S may attach to the photosensitive drum 411. This paper dust is removed from the photosensitive drum 411 by the cleaning portion 414 and collected by the collection portion 415.

The cleaning portion 414 is constituted by the cleaning roller 4141, which is a cleaning member, and the separation roller 4142, which is a separation member. The collection portion 415 is constituted by the collection pad 4151 that is a member for collecting paper dust attached to the separation roller 4142, and the collection container 4152 that is a member for storing the collected paper dust.

The cleaning portion 414 will be described. The cleaning roller 4141 is a roller obtained by wrapping an elastic member such as a sponge around a metal shaft. The separation roller 4142 is a metal roller. The cleaning roller 4141 is in contact with the photosensitive drum 411. The separation roller 4142 is in contact with the cleaning roller 4141.

The cleaning roller 4141 can clean paper dust attached to the photosensitive drum 411 (remove paper dust from the photosensitive drum 411). More specifically, a bias is applied to the cleaning roller 4141 by a bias applying unit (not shown) to create a potential difference between the cleaning roller 4141 and the photosensitive drum 411. For example, if a potential difference is created such that the potential of the cleaning roller 4141 is more positive than the potential of the photosensitive drum 411, negatively-charged paper dust can be attracted to the cleaning roller 4141 and collected. Also, if a potential difference is created such that the potential of the cleaning roller 4141 is more negative than the potential of the photosensitive drum 411, positively-charged paper dust can be attracted to the cleaning roller 4141 and collected.

The paper dust cleaned by the cleaning roller 4141 is separated by the separation roller 4142. A bias is applied to the separation roller 4142 by a bias applying unit (not shown). By providing a potential difference between the cleaning roller 4141 and the separation roller 4142, paper dust on the cleaning roller can be separated. For example, if the developer is positively charged and the paper dust is negatively charged, by creating a potential difference such that the potential of the separation roller 4142 is more positive than the potential of the cleaning roller 4141, it is possible to effectively separate paper dust.

The collection portion 415 will be described. The collection pad 4151 is a sponge member. Also, the collection pad 4151 is in contact with the separation roller 4142. The paper dust on the separation roller 4142 is scraped off by the collection pad 4151 and collected inside the collection container 4152.

As described above, paper dust attached to the photosensitive drum 411 is removed by the cleaning portion 414 incorporated in the drum cartridge 41 and collected by the collection portion 415.

Collection of Paper Dust from Recording Material S

Collection of paper dust from the recording material S will be described with reference to FIG. 9. As described above in "Paper Feeding Portion and Conveying Portion", the recording material S fed from the paper feeding portion 2 is conveyed to the downstream conveyance roller portion 32, and is sandwiched between the first conveyance roller 321 and the second conveyance roller 322. Since a developer image is formed on the surface of the recording material S that comes into contact with the second conveyance roller 322, it is preferable to remove paper dust before the photosensitive drum 411 and the recording material S come into contact with each other.

As shown in FIG. 9, the conveyance collection scraper 4171, which is a paper dust collecting member (foreign matter removing member), comes into contact with the surface of the second conveyance roller 322 and removes the paper dust attached to the surface of the second conveyance roller 322. The conveyance collection scraper 4171 is a sheet-like member, and a flexible material such as PET can be selected. The conveyed paper dust storage portion 4172, which is a paper dust storing portion (foreign matter storage portion), is a space formed in the drum cartridge frame 410. The front contact member 4173, which is the front paper dust leakage preventing member (front foreign matter leakage preventing member), and the rear contact member 4174, which is the rear paper dust leakage preventing member (rear foreign matter leakage preventing member) each have one end fixed by being attached to the conveyed paper dust storage portion 4172. The other end is a free end and comes into contact with the second conveyance roller 322.

As shown in FIG. 9, the conveyance collection scraper 4171 can scrape off paper dust attached to the surface by bringing an edge portion of its distal end into contact with the second conveyance roller 322. Also, the front contact member 4173 and the rear contact member 4174 prevent paper dust from leaking from the conveyed paper dust storage portion 4172 to the outside by coming into contact with the second conveyance roller 322.

Next, the paper dust collection operation in the downstream conveyed paper dust collection portion 417 will be described in detail.

The second conveyance roller 322 can be configured to include, for example, a roller body made of metal and a coating layer made of fluororesin that covers the outer peripheral surface of the roller body. The second conveyance roller 322 is negatively charged by friction due to the effect of the fluorine in the coating layer during contact (sliding) with the conveyance collection scraper 4171, the front contact member 4173, and the rear contact member 4174. As a result, the second conveyance roller 322 can attract the positively-charged paper dust attached to the surface of the recording material S.

Alternatively, the raw material of the coating layer of the second conveyance roller 322 can also be nylon (registered trademark). In this case, the second conveyance roller 322 is positively charged by friction due to the effect of nylon (registered trademark) in the coating layer during contact with the conveyance collection scraper 4171, the front contact member 4173, and the rear contact member 4174. As a result, the second conveyance roller 322 can attract the negatively-charged paper dust attached to the surface of the recording material S.

Also, as shown in FIG. 8D, a bias applying unit 140 constituted by a high-voltage power supply or the like provided in the apparatus main body 1 is connected to the second conveyance roller pressure spring 14 described above. The bias applying unit 140 is a unit for applying a bias to the second conveyance roller 322 to create a potential difference between the second conveyance roller 322 and the first conveyance roller 321. The bias applied by the bias applying unit 140 can be applied to the second conveyance roller 322 via the second conveyance roller pressure spring 14 and the driven roller bearing 3221. By using a rubber roller with a metal shaft as the first conveyance roller 321 and electrically connecting it to ground, an electric field resulting from a potential difference is generated between the second conveyance roller 322 and the first conveyance roller 321 due to the applied bias. In this case, the second conveyance roller 322 does not necessarily need a coating layer. For example, when the applied bias is made positive, the negatively-charged paper dust on the surface of the recording material S can be attracted to the second conveyance roller 322. By applying a negative bias, it is possible to attract positively-charged paper dust. Furthermore, the polarity of the applied bias may also be switched depending on whether the recording material S is passing through the nip portion of the downstream conveyance roller portion 32 or is not passing therethrough. For example, by switching the polarity of the bias applied to the second conveyance roller 322 when the recording material S is not passing through the nip portion of the downstream conveyance roller portion 32, paper dust attached to the surface of the first conveyance roller 321 can be attracted to the second conveyance roller 322.

In this way, the second conveyance roller 322 can attract paper dust attached to the surface of the recording material S by the action of frictional charging or the applied bias. The attracted paper dust rotates while remaining attached to the surface of the second conveyance roller 322. Whether the second conveyance roller 322 is charged positively or negatively may be selected as appropriate depending on the material or the like of the recording material S used for image formation. For example, when using a recording material containing a large amount of talc, it is desirable to charge the second conveyance roller 322 positively because talc tends to be negatively charged. Also, in the case of a recording material containing a large amount of calcium carbonate, it is desirable to charge the second conveyance roller 322 negatively because calcium carbonate tends to be positively charged.

Here, in the method that utilizes the charging ability of the material of the coating layer of the second conveyance roller 322, the charging polarity is limited depending on the selected material. However, since a unit for applying a bias is not required, costs can be reduced. Also, in this example, a configuration has been described in which a coating layer is provided on the surface layer of the second conveyance roller 322 to attract paper dust by the effect of frictional charging. However, any configuration other than the one including the coating layer may be used as long as the effect of frictional charging can be obtained. Examples include a configuration in which the second conveyance roller 322 is integrally molded from resin, and a configuration in which the resin roller is attached to a metal shaft.

The method utilizing an applied bias increases the degree of freedom in selecting the polarity. Furthermore, since it is possible to change the timing of bias application, it is expected that the paper dust recovery ability will be improved.

The paper dust attracted to the second conveyance roller 322 is removed from the second conveyance roller 322 by the conveyance collection scraper 4171. As shown in FIG. 9, the conveyance collection scraper 4171 has one end fixed to the drum cartridge frame 410, and the other end thereof is a free end. The distal end of the free end faces rearward in FIG. 9. The distal end on the free end side comes into contact with the second conveyance roller 322. In FIG. 9, the second conveyance roller 322 rotates clockwise. That is, the conveyance collection scraper 4171 is in contact with the surface of the second conveyance roller 322 in the counter direction. Due to this contact in the counter direction, the conveyance collection scraper 4171 can obtain sufficient contact pressure against the second conveyance roller 322. Accordingly, it is possible to effectively scrape off paper dust on the second conveyance roller 322.

The conveyed paper dust storage portion 4172 is a space in which the paper dust scraped off by the conveyance collection scraper 4171 is collected. As shown in FIG. 9, one end of each of the front contact member 4173 and the rear contact member 4174, which will be described later, is fixed to the drum cartridge frame 410, and the other end is in contact with the second conveyance roller 322. The conveyed paper dust storage portion 4172 is formed by a space defined by the front contact member 4173, the rear contact member 4174, and the second conveyance roller 322. The contact position between the free end of the conveyance collection scraper 4171 and the second conveyance roller 322 is located inside this space. The paper dust attached to the second conveyance roller 322 is scraped off by the free end of the conveyance collection scraper 4171, and is stored inside the conveyed paper dust storage portion 4172.

As described above, in this example, the paper dust attached to the photosensitive drum 411 is cleaned by the cleaning portion 414 and collected by the collection portion 415. Also, paper dust that has been conveyed by the conveying portion 3 and is attached to the recording material S is collected by the downstream conveyed paper dust collection portion 417.

Paper Dust Leakage Preventing Member

Figure 10A:
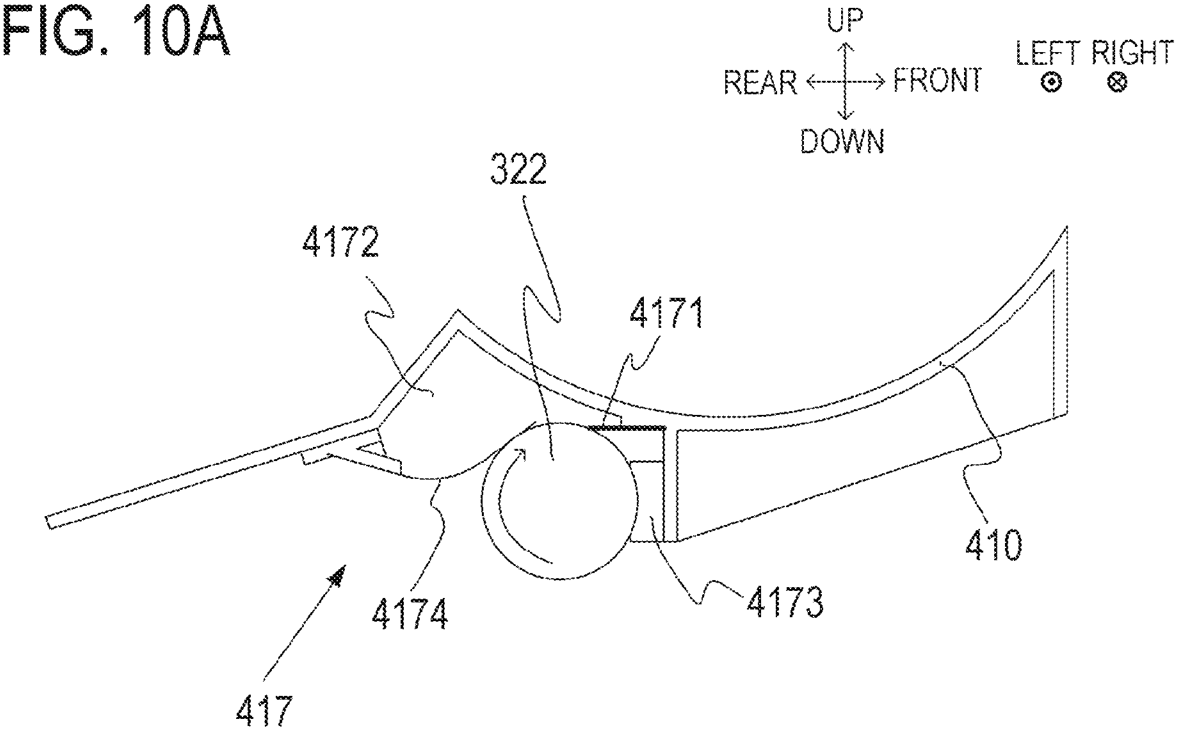
FIGS. 10A and 10B are partial cross-sectional views showing a positional relationship between a conveyed paper dust collection portion and the second conveyance roller.
Figure 10B:
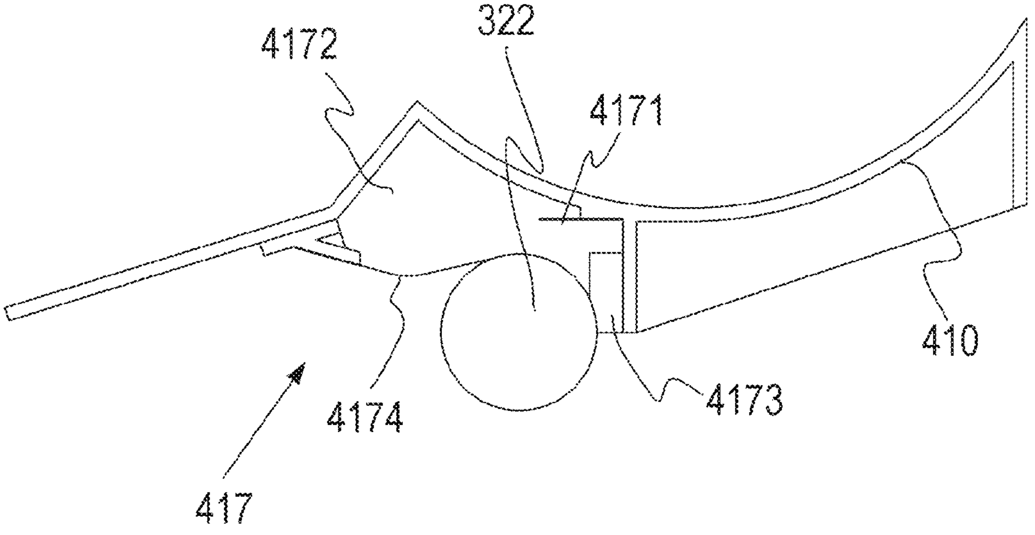

The front contact member 4173 and the rear contact member 4174 will be described with reference to FIGS. 10A and 10B. FIGS. 10A and 10B are partial cross-sectional views showing the positional relationship between the downstream conveyed paper dust collection portion 417 and the second conveyance roller 322. FIG. 10A shows a state in which the drum cartridge 41 is attached to the apparatus main body 1, and FIG. 10B shows a state in which the drum cartridge 41 is outside the apparatus main body 1 (a state in which it is detached from the apparatus main body 1).

As described in "Movement Path of Second Conveyance Roller When Attaching and Detaching Drum Cartridge" above, the second conveyance roller 322 moves within the drum cartridge 41. When the drum cartridge 41 is attached to the apparatus main body 1, the second conveyance roller 322 is in the position shown in FIG. 10A (hereinafter referred to as the first position). When the drum cartridge 41 is detached from the apparatus main body 1, it is in the position shown in FIG. 10B (hereinafter referred to as the second position). As shown in FIG. 10A, when the second conveyance roller 322 is in the first position, the second conveyance roller 322 is in contact with the conveyance collection scraper 4171, and is in contact with the front contact member 4173 and the rear contact member 4174. On the other hand, as shown in FIG. 10B, when the second conveyance roller 322 is in the second position, the second conveyance roller 322 is out of contact with the conveyance collection scraper 4171, but is in contact with the front contact member 4173 and the rear contact member 4174. In this way, the front contact member 4173 and the rear contact member 4174 maintain contact with the second conveyance roller 322 regardless of whether the second conveyance roller 322 is in the first position or the second position. Accordingly, the paper dust removed from the second conveyance roller 322 by the conveyance collection scraper 4171 is prevented from leaking out of the conveyed paper dust storage portion 4172, regardless of whether the drum cartridge 41 is attached to or detached from the apparatus main body 1.

Also, in this example, the front contact member 4173 is a sponge member, and the rear contact member 4174 is a sheet member. In a configuration in which a coating layer is formed on the second conveyance roller 322 and paper dust is attracted by frictional charging, the following effects can be expected by using a sponge member as the rear contact member 4174. That is, the second conveyance roller 322 rotates clockwise. By bringing the sponge member into contact with the nip portion of the first conveyance roller 321 on the upstream side in the rotational direction of the second conveyance roller 322, effective frictional charging becomes possible.

On the other hand, the rear contact member 4174 has one end fixed to the drum cartridge frame 410, and the other end is a sheet member with a free end. Furthermore, the free end of the rear contact member 4174 is set to extend along the rotational direction of the second conveyance roller 322. That is, the rear contact member 4174 is in contact with the surface of the second conveyance roller 322 in the forward direction with respect to the rotational direction of the second conveyance roller 322. The rear contact member 4174 is significantly bent when the second conveyance roller 322 is in the first position, and is slightly bent when the second conveyance roller 322 is in the second position. It is necessary to devise the material of the rear contact member 4174 so as not to scrape off the attracted paper dust when the second conveyance roller 322 is in the first position. According to studies conducted by the inventor of the present invention, a flexible sheet member such as PET, which has a smooth surface layer, or urethane rubber, which has low elasticity, is suitable as the rear contact member 4174. In particular, it has been found that a urethane rubber sheet has a small repulsive force when bent, making it less likely to scrape off the paper dust.

As described above, the front contact member 4173 and the rear contact member 4174 maintain contact with the second conveyance roller 322 when the second conveyance roller 322 is in the first position and when the second conveyance roller 322 is in the second position. Furthermore, using a sponge member as the front contact member 4173 makes it possible to effectively attract paper dust by frictional charging. Also, by using the rear contact member 4174 as a flexible sheet member, paper dust will not be scraped off even when the second conveyance roller 322 is in the first position.

That is, by devising the configurations of the front contact member 4173 and the rear contact member 4174, it is possible to improve the performance of the paper dust storage portion.

Modified Example of Conveyed Paper Dust Leakage Preventing Member

Figure 11A:
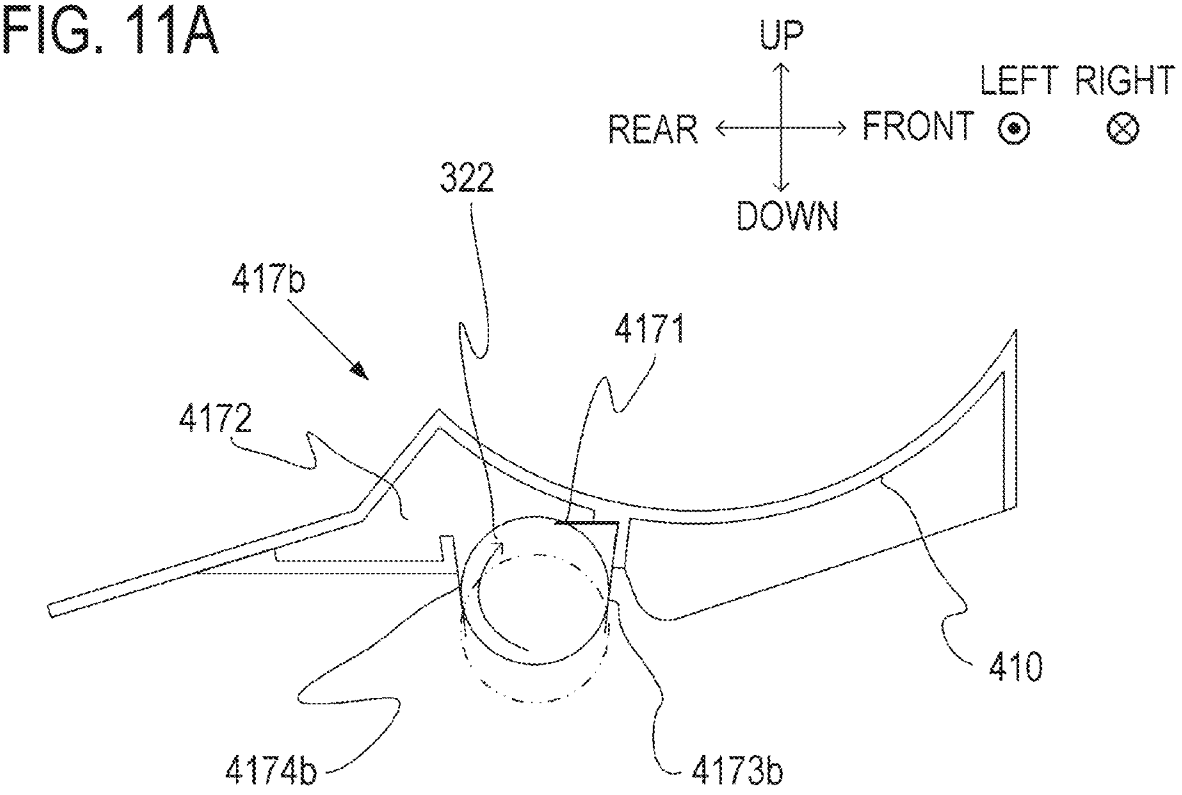
FIGS. 11A and 11B are partial cross-sectional views showing a positional relationship between the conveyed paper dust collection portion and the second conveyance roller.
Figure 11B:
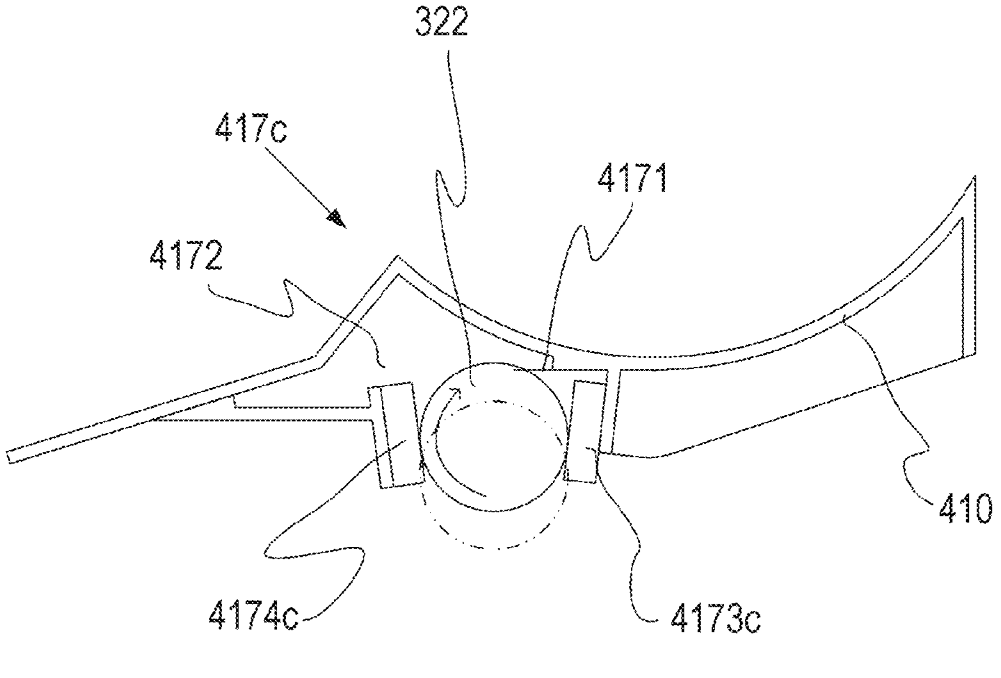

A modified example of the front contact member 4173 and the rear contact member 4174 will be described with reference to FIGS. 11A and 11B. FIGS. 11A and 11B are partial cross-sectional views showing the positional relationship between downstream conveyed paper dust collection portions 417*b* and 417*c* and the second conveyance roller 322 according to a modified example. FIG. 11A shows the downstream conveyed paper dust collection portion 417*b* of Modified Example 1, and FIG. 11B shows the downstream conveyed paper dust collection portion 417*c* of Modified Example 2. Also, in both FIGS. 11A and 11B, the second conveyance roller 322 in the second position is indicated by a two-dot chain line, and the second conveyance roller 322 in the first position is indicated by a solid line.

The downstream conveyed paper dust collection portion 417*b* of Modified Example 1 shown in FIG. 11A includes a front contact member 4173*b* and a rear contact member 4174*b*, both of which are flexible sheet members. Furthermore, the direction in which the free end of the rear contact member 4174*b* extends is the direction opposite to the rotational direction of the second conveyance roller 322. Accordingly, the rear contact member 4174*b* is set so as to come into contact with the second conveyance roller 322 in the counter direction. In the example described in "Conveyed Paper Dust Leakage Preventing Member" above, when the second conveyance roller 322 was in the first position, it was necessary to significantly bend the rear contact member 4174. However, according to Modified Example 1, it is possible to reduce the difference in the amount of bending of the rear contact member 4174*b* between when the second conveyance roller 322 is in the first position and when the second conveyance roller 322 is in the second position. Also, the front contact member 4173*b* is a sheet member. Urethane rubber can be selected as the material for the sheet member. By using urethane rubber as the front contact member 4173*b*, it is possible to apply frictional charging to the coating layer of the second conveyance roller 322.

The downstream conveyed paper dust collection portion 417*c* of Modified Example 2 shown in FIG. 11B includes a front contact member 4173*c* and a rear contact member 4174*c*, both of which are sponge members. An elastic member such as a sponge has a characteristic of high followability when it comes into contact with the surface of the second conveyance roller 322. On the other hand, when using a sponge member as the rear contact member 4174*c*, it is necessary to devise a method to prevent paper dust attached to the second conveyance roller 322 from being scraped off. In this modification, this problem is solved by applying a film member with high slidability to the surface layer of the rear contact member 4174. Examples of film members with high slidability include high molecular weight polyethylene, fluororesin (PTFE), and the like.

That is, as in the modified examples shown in FIGS. 11A and 11B, the materials and free end settings of the front contact member 4173 and the rear contact member 4174 can be selected as appropriate depending on the usage conditions. The usage conditions include various conditions such as whether or not paper dust attached to the surface of the second conveyance roller 322 is not scraped off, whether or not the coating layer of the second conveyance roller 322 requires frictional charging, the cost, and the usage environment.

As described above, according to Example 1 of the present invention, a sealed state in the downstream conveyed paper dust collection portion 417 can be favorably maintained regardless of whether the drum cartridge 41 is attached to the apparatus main body 1 or detached from the apparatus main body 1. That is, regardless of whether the drum cartridge 41 is attached to or detached from the apparatus main body 1, a state of contact between the second conveyance roller 322, the front contact member 4173, and the rear contact member 4174 can be maintained. Accordingly, the paper dust removed and collected from the second conveyance roller 322 can be prevented from leaking from the conveyed paper dust storage portion 4172. Also, a flexible sheet material or an elastic material such as sponge can be selected as the material of the front contact member 4173 and the rear contact member 4174.

As described above, according to this example, even if the second conveyance roller 322 moves from the first position to the second position when the drum cartridge 41 is detached from the apparatus main body 1, the collected paper dust can be prevented from leaking. That is, it is possible to improve the performance of the paper dust storage portion that stores paper dust removed from the recording material.

Example 2

An image forming apparatus according to Example 2, which is a second aspect of the invention, will be described with reference to FIGS. 12 and 13. Note that the configuration of the apparatus main body 1 and the like in the image forming apparatus according to Example 2 is the same as that of the image forming apparatus according to Example 1, and therefore is denoted by the same reference numerals, and description thereof will be omitted.

Conveyed Paper Dust Storing Portion

Figure 12:
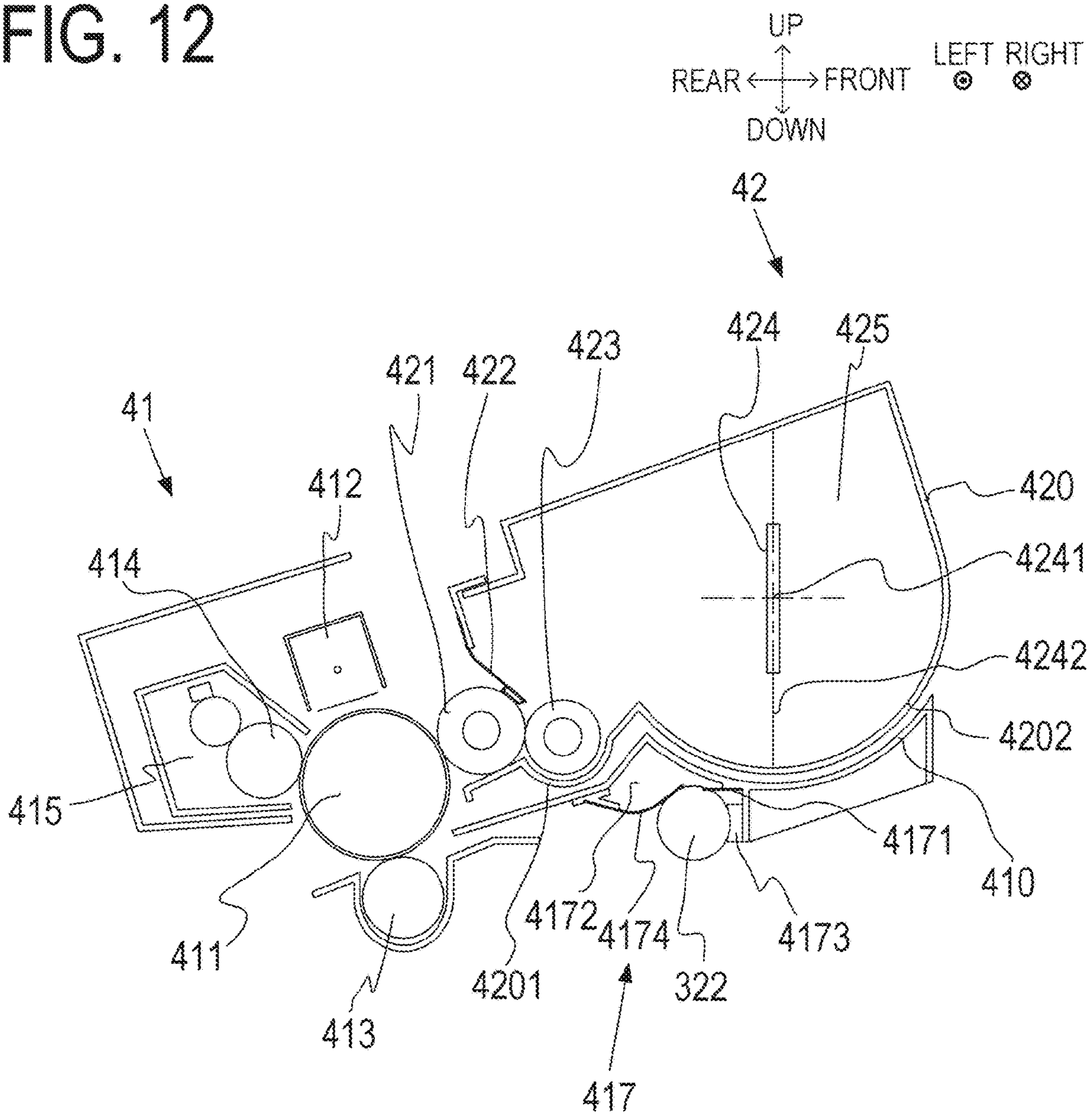
FIG. 12 is a partial cross-sectional view showing a schematic configuration of the drum cartridge and the developing cartridge.

FIG. 12 is a partial cross-sectional view showing a schematic configuration of the drum cartridge 41 and the developing cartridge 42. As shown in FIG. 12, the drum cartridge 41 has a drum cartridge frame 410, as described in Example 1. Furthermore, a conveyed paper dust storage portion 4172 that stores paper dust in the downstream conveyed paper dust collection portion 417 is formed in the drum cartridge frame 410. The developing cartridge 42 has a developing cartridge frame 420, and as described in Example 1, the developing roller 421, the supply roller 423, the conveyance paddle 424, and the developer storage portion 425 that stores the developer are integrated by the developing cartridge frame 420. Increasing the volumes of the conveyed paper dust storage portion 4172 that stores paper dust and the developer storage portion 425 that stores developer is effective in extending the lifespans of the drum cartridge 41 and the developing cartridge 42. However, there is a concern that expanding these volumes will lead to an increase in the size of the apparatus main body 1.

As shown in FIG. 12, the bottom shape of the developing cartridge frame 420 is determined by the configurations of the supply roller 423 and the conveyance paddle 424. Details will be described below.

It is desirable that the supply roller 423 and the developing cartridge frame 420 have a predetermined gap. If the gap is too large, a large amount of developer will remain in the gap. If the gap is too small, the gap may become clogged with developer, which may impede the rotation of the supply roller 423 and the circulation of the developer, thereby promoting deterioration of the supply roller 423. Accordingly, it is desirable that the shape of the developing cartridge frame 420 near the supply roller 423 is a circular arc shape that is concentric with the supply roller 423 (hereinafter referred to as a first circular arc 4201). According to studies conducted by the inventor of the present invention, it has been found that favorable results can be obtained when this gap is set between 0.5 mm and 2.0 mm.

Also, the conveyance paddle 424 rotates clockwise around a rotation center 4241. Also, the conveyance paddle 424 has a conveyance blade 4242. The conveyance blade 4242 is made of a flexible sheet member such as polyethylene terephthalate (PET), polyethylene (PE), or fluororesin (PTFE). Also, the distal end of the conveyance blade 4242 is set to come into contact with the bottom of the developer storage portion 425 formed by the developing cartridge frame 420. With this setting, it is possible to reduce the amount of developer remaining at the bottom of the developer storage portion 425. As described above, since the conveyance paddle 424 rotates, in order to stabilize the contact between the conveyance blade 4242 and the bottom of the developer storage portion 425, it is desirable that the shape of the bottom of the developer storage portion 425 is a circular arc shape centered on the rotation center 4241 (hereinafter referred to as a second circular arc 4202). Accordingly, the shape of the bottom of the developing cartridge frame 420 is formed by the first circular arc 4201 (first circular arc portion), the second circular arc 4202 (second circular arc portion), and a joint portion 4203 that connects these. The first circular arc 4201 has a shape that extends along the outer periphery of the supply roller 423. Also, the second circular arc 4202 has a shape that extends along the rotation path of the conveyance paddle 424.

Figure 13:
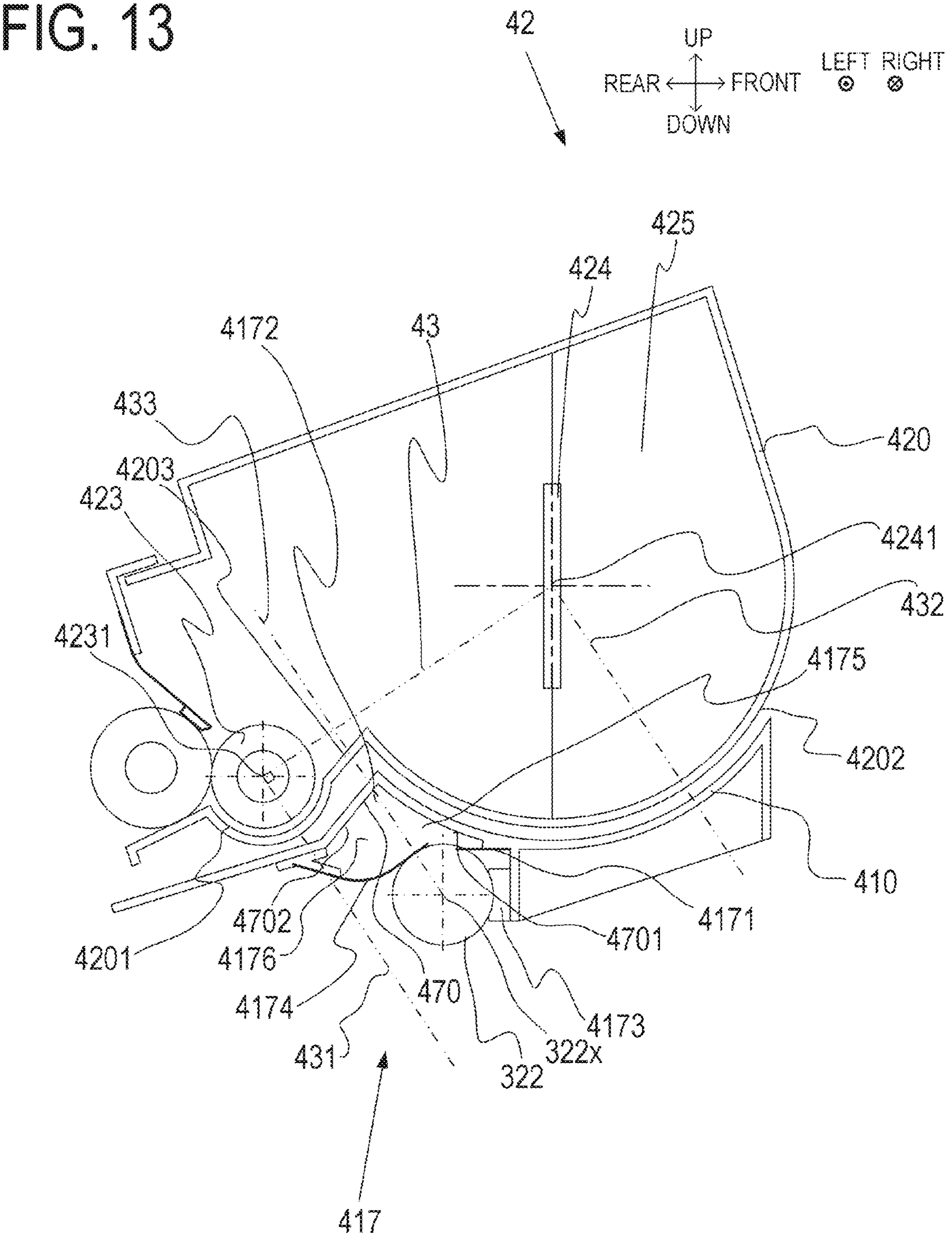
FIG. 13 is a partial cross-sectional view showing a schematic configuration of the conveyed paper dust collection portion and the developing cartridge.

FIG. 13 is a partial cross-sectional view showing a schematic configuration of the downstream conveyed paper dust collection portion 417 and the developing cartridge 42. As shown in FIG. 13, the second conveyance roller 322 is arranged between the supply roller 423 and the conveyance paddle 424. More specifically, the second conveyance roller 322 is arranged as follows.

As shown in FIG. 13, when viewed in the direction of the rotation axis of the supply roller 423, a virtual line connecting a rotation center 4231 of the supply roller 423 and the rotation center 4241 of the conveyance paddle 424 is a first auxiliary line 43 (first virtual line). A virtual line that is orthogonal to the first auxiliary line 43 and passes through the rotation center 4231 of the supply roller 423 is a second auxiliary line 431 (third virtual line). A virtual line that is orthogonal to the first auxiliary line 43 and passes through the rotation center 4241 of the conveyance paddle 424 is a third auxiliary line 432 (fourth virtual line). The second conveyance roller 322 is arranged between the second auxiliary line 431 and the third auxiliary line 432. Also, in this example, the conveyed paper dust storage portion 4172 is also arranged between the second auxiliary line 431 and the third auxiliary line 432.

In this example, even if the downstream conveyed paper dust collection portion 417 is provided, in order to reduce the increase in size of the apparatus main body 1, the conveyed paper dust storage portion 4172 of the downstream conveyed paper dust collection portion 417 is arranged as follows. The conveyed paper dust storage portion 4172 is formed so as to fit into a recessed shape at the bottom of the developing cartridge frame 420, which is formed at a part connecting the first circular arc 4201 and the second circular arc 4202. More specifically, the conveyed paper dust storage portion 4172 is set as follows. The conveyed paper dust storage portion 4172 has a shape that follows the outer shapes of the first circular arc 4201 and the second circular arc 4202 at the bottom of the developing cartridge frame 420 and the joint portion 4203, which has a shape that connects them, and the drum cartridge frame 410 is formed by a recessed shape portion 470 that opposes these with a predetermined gap therebetween. The recessed shape portion 470 has a configuration corresponding to the outer shapes of the first circular arc 4201, the second circular arc 4202, and the like at the bottom of the developing cartridge frame 420. That is, the recessed shape portion 470 includes a first wall portion 4701 opposing the second circular arc 4202 at the bottom of the developing cartridge frame 420, and a second wall portion 4702 opposing the first circular arc 4201 and the joint portion 4203 at the bottom of the developing cartridge frame 420. The conveyed paper dust storage portion 4172 is formed by the space defined by the recessed shape portion 470 of the drum cartridge frame 410 formed in this manner, the second conveyance roller 322, and the front contact member 4173 and rear contact member 4174 that come into contact with these.

In particular, the shape of the second circular arc 4202 influences the conveyance paddle 424 and the developer storage portion 425. Accordingly, it is desirable that the conveyed paper dust storage portion 4172 is provided so as not to influence the second circular arc 4202. In view of this, in this example, the conveyed paper dust storage portion 4172 is defined as follows. That is, as shown in FIG. 13, when viewed in the direction of the rotational axis of the supply roller 423, a virtual line that is parallel to the second auxiliary line 431 and passes through a rotation center 322*x* of the second conveyance roller 322 is a third auxiliary line 433 (second virtual line). Then, the conveyed paper dust storage portion 4172 is partitioned (divided) into two regions by the third auxiliary line 433, and one of the two regions, which is closer to the conveyance paddle 424, is a front region 4175, which is a first region, and the other region, which is closer to the supply roller 423, is defined as a rear region 4176, which is a second region. The front region 4175 is a region of the conveyed paper dust storage portion 4172 that is defined by the first wall portion 4701 of the recessed shape portion 470. The rear region 4176 is a region of the conveyed paper dust storage portion 4172 that is defined by the second wall portion 4702 of the recessed shape portion 470. When comparing the cross-sectional areas of the front region 4175 and the rear region 4176, the front region 4175 is defined to be smaller. This definition makes it possible to prevent the second circular arc 4202 from being influenced.

That is, during stable developer agitation and conveyance by the conveyance paddle 424, the shape of the inner wall surface of the developing cartridge frame 420, on which the distal end of the conveyance paddle 424 (conveyance blade 4242) slides, preferably is an arc shape that extends along the rotational path of the conveyance paddle 424. This is because the shape of the second circular arc 4202 that extends along the rotational path of the conveyance paddle 424 stabilizes the contact between the conveyance paddle 424 and the inner wall surface of the developing cartridge frame 420. For example, if the second circular arc 4202 is changed to a different shape in order to expand the conveyed paper dust storage portion 4172 toward the developer storage portion 425 side, there is a risk that the stability of developer stirring and conveyance by the conveyance paddle 424 will be impaired. This example has a configuration in which the space and shape of the developer storage portion 425 are ensured, and the paper dust storage space is ensured by using the dead space between the second circular arc 4202 and the first circular arc 4201. This makes it possible to improve the paper dust collection ability without reducing the developer conveyance ability.

As described above, when the conveyed paper dust storage portion 4172 is divided into the front region 4175 and the rear region 4176, the influence on the second circular arc 4202 is reduced by defining the front region 4175 as being smaller. Accordingly, even if the downstream conveyed paper dust collection portion 417 is provided, an increase in size of the apparatus main body 1 can be reduced.

Note that although it is best for the paper dust storage capacity of the conveyed paper dust storage portion 4172 in the downstream conveyed paper dust collection portion 417 to be large, a sufficient paper dust collection effect for the image forming apparatus as a whole can be expected even if, for example, the paper dust storage capacity of the conveyed paper dust storage portion 4172 is smaller than the paper dust storage capacity of the collection container 4152 of the collection portion 415. That is, the downstream conveyed paper dust collection portion 417 can be said to be an auxiliary paper dust collecting unit for the collection portion 415, or a paper dust collecting unit in advance of the image forming operation, and the downstream conveyed paper dust collection portion 417 is not required to have a large paper dust storage capacity. The paper dust collected by the collection portion 415 includes paper dust generated when the recording material S is rubbed at the nip portion between the photosensitive drum 411 and the transfer roller 413, and there is a difference in the breakdown from the paper dust that is collected by the downstream conveyed paper dust collection portion 417. Due to the paper dust previously carried on the recording material S before image formation is performed being collected in the downstream conveyed paper dust collection portion 417 in advance before entering the nip portion, the paper dust collection ability in the downstream collection portion 415 can be increased. Also, by distributing the collected paper dust between the downstream conveyed paper dust collection portion 417 and the collection portion 415, it is possible to maintain the collection function of the collection portion 415 over a long period of time. That is, it is possible not only to improve the paper dust storage capacity (paper dust sealing ability) in the downstream conveyed paper dust collection portion 417 described in Example 1, but also to improve the performance of the paper dust collecting unit of the apparatus as a whole. Also, by keeping the size of the conveyed paper dust storage portion 4172 in the downstream conveyed paper dust collection portion 417 to a level at which it possible to ensure the minimum required amount of paper dust, it is possible to contribute to reducing the size of the cartridge, reducing an increase in the size of the image forming apparatus, and the like.

Figure 14:
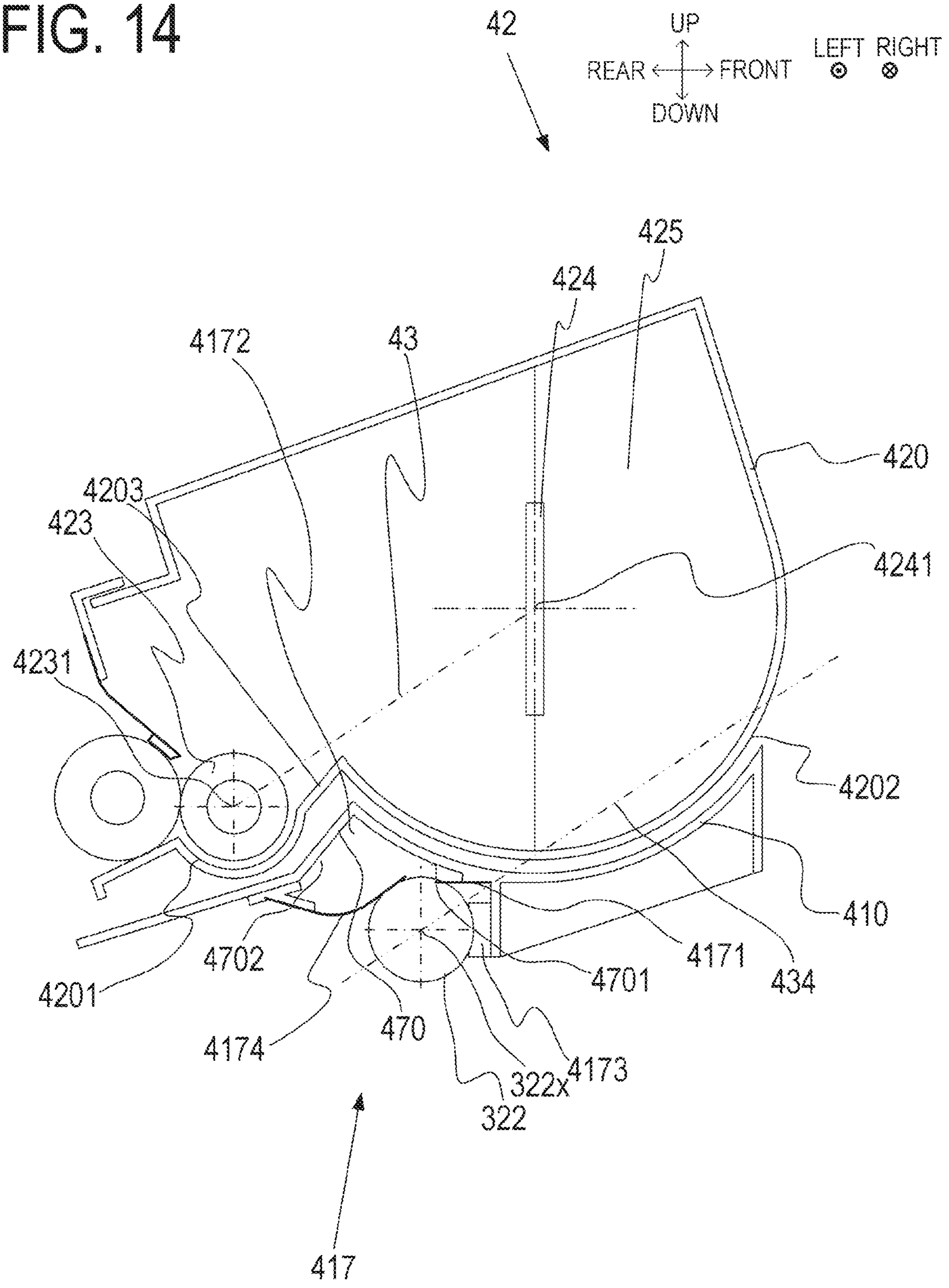
FIG. 14 is a partial cross-sectional view showing a schematic configuration of the conveyed paper dust collection portion and the developing cartridge.

FIG. 14 is a partial cross-sectional view showing a schematic configuration of the downstream conveyed paper dust collection portion 417 and the developing cartridge 42. As shown in FIG. 14, when viewed in the direction of the rotational axis of the supply roller 423, a virtual line that is parallel to the first auxiliary line 43 and passes through the rotation center 322*x* of the second conveyance roller 322 is a fourth auxiliary line 434 (fifth virtual line). The conveyed paper dust storage portion 4172 of the downstream conveyed paper dust collection portion 417 is formed in a range included in the region between the first auxiliary line 43 and the fourth auxiliary line 434. The dead space between the second circular arc 4202 and the first circular arc 4201 is a space that occurs more or less in a cartridge configuration including the conveyance paddle 424 and the supply roller 423 serving as stirring members, as in this example. It can be said that the conveyed paper dust storage portion 4172 of this example has a configuration that makes maximum use of this dead space. Note that, a portion of the conveyed paper dust storage portion 4172 may also protrude outside of the fourth auxiliary line 434 on the premise that this dead space is effectively utilized.

Figure 15:
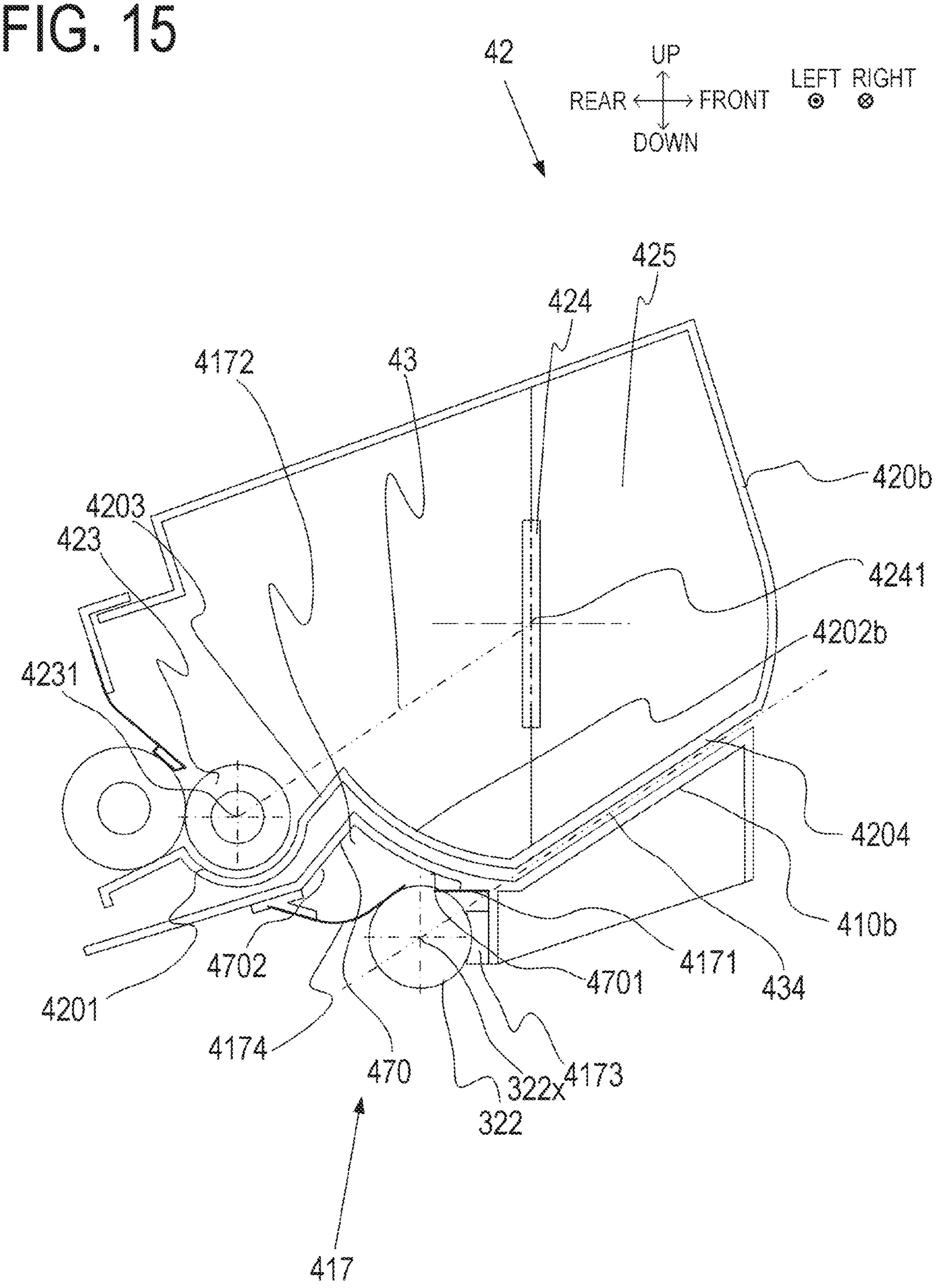
FIG. 15 is a partial cross-sectional view showing a schematic configuration of the conveyed paper dust collection portion and the developing cartridge.

FIG. 15 is a partial cross-sectional view showing a cartridge configuration of Modified Example 3, which differs from Examples 1 and 2 in the frame structure of the cartridge. The cartridge configuration of Modified Example 3 includes a developing cartridge frame 420 that is smaller in size than the cartridge configurations of Examples 1 and 2.

In the cartridge configurations of Examples 1 and 2, the developer storage portion 425 is configured to extend beyond the fourth auxiliary line 434. In contrast, in the cartridge configuration of Modified Example 3, the developer storage portion 425 is configured not to exceed the fourth auxiliary line 434. That is, as shown in FIG. 15, in the developing cartridge frame 420*b* of this modified example, the second circular arc 4202*b* is formed only in a predetermined range adjacent to the joint portion 4203, and specifically, in a range included between the first auxiliary line 43 and the fourth auxiliary line 434. Furthermore, the developing cartridge frame 420*b* is provided such that the linear portion 4204 continuous with the second circular arc 4202*b* extends along the fourth auxiliary line 434, so that the developer storage portion 425 does not straddle the fourth auxiliary line 434. That is, the developing cartridge frame 420*b* has a configuration that reduces the size of the developer storage portion 425, thereby reducing the size of the cartridge. In such a cartridge configuration as well, dead space will occur between the second circular arc 4202 and the first circular arc 4201. It can be said that the conveyed paper dust storage portion 4172 of this modified example has a configuration that makes maximum use of this dead space.

As described above, during stable developer agitation and conveyance by the conveyance paddle 424, the shape of the inner wall surface of the developing cartridge frame 420 on which the distal end of the conveyance paddle 424 (conveyance blade 4242) slides preferably is an arcuate surface shape that extends along the rotation path of the conveyance paddle 424. This is because the shape of the second circular arc 4202*b* that extends along the rotational path of the conveyance paddle 424 stabilizes the contact between the conveyance paddle 424 and the inner wall surface of the developing cartridge frame 420. According to the cartridge configuration of Modified Example 3, by forming (maintaining) the second circular arc 4202*b* at least in the region connected to the joint portion 4203, stable agitation and conveyance of the developer by the conveyance paddle 424 can be ensured, and the cartridge can be made smaller.

Other Cartridge Modes

Figure 16A:
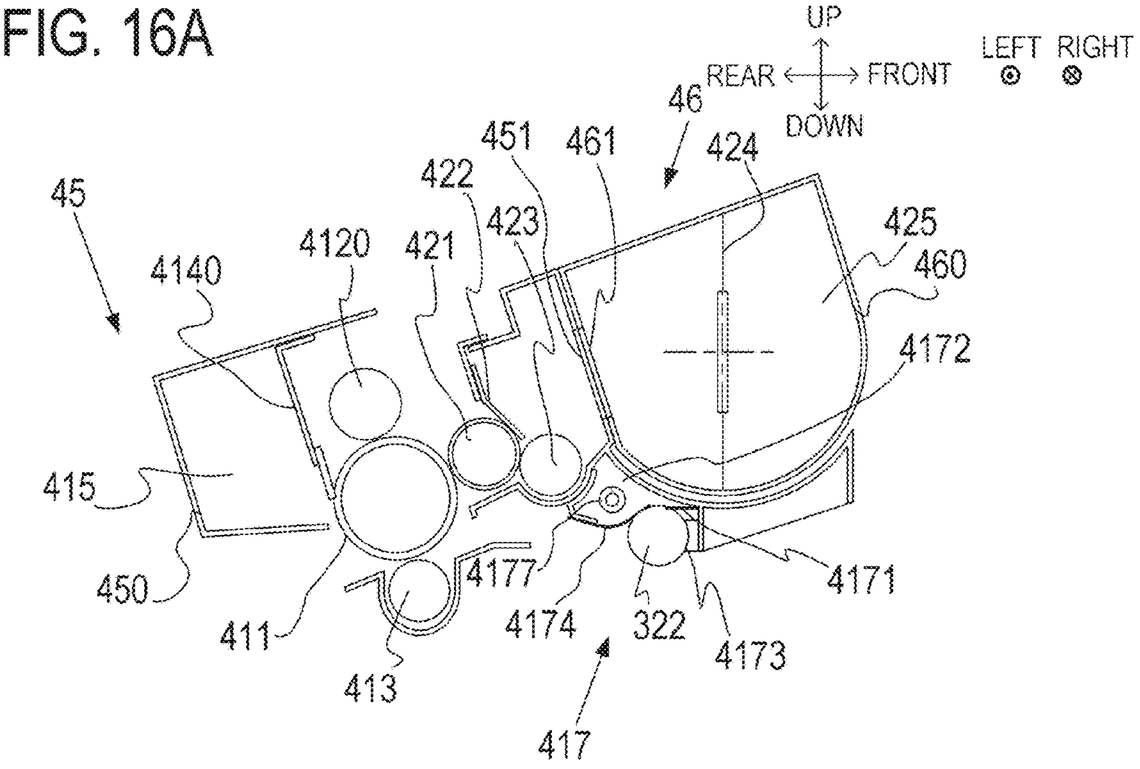
FIGS. 16A and 16B are partial cross-sectional views showing a schematic configuration of another cartridge mode.
Figure 16B:
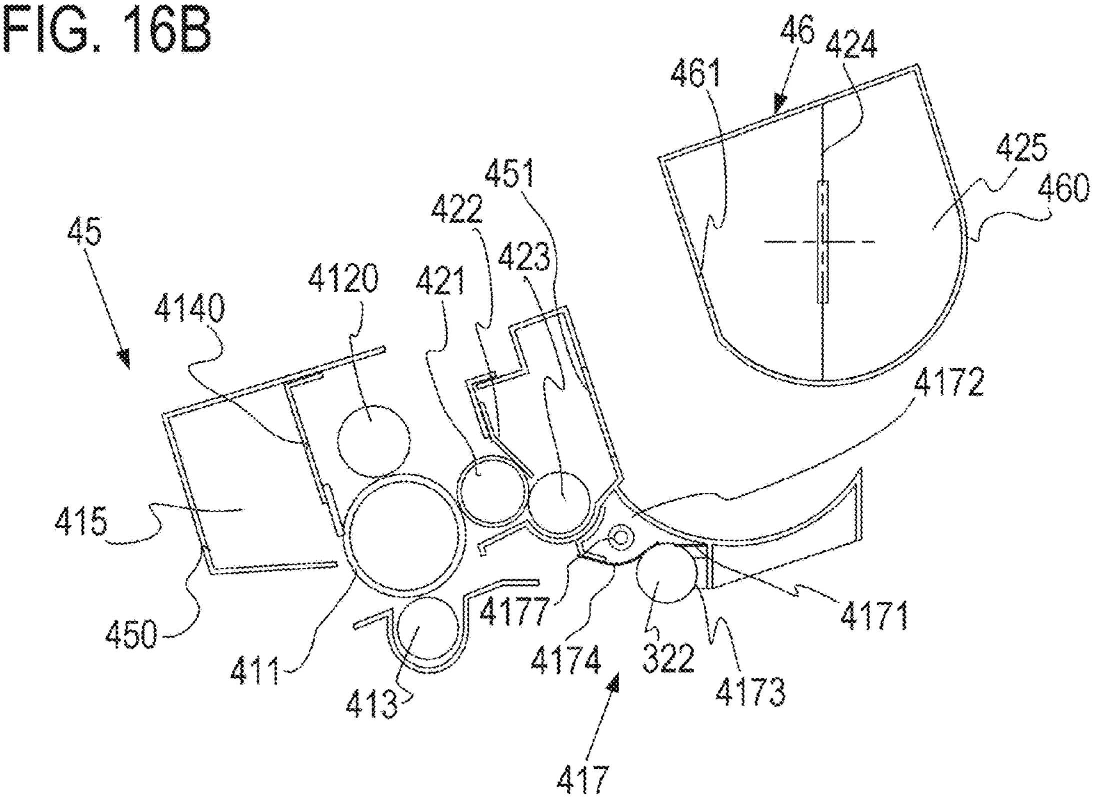

Other cartridge modes will be described with reference to FIGS. 16A and 16B. FIGS. 16A and 16B are partial cross-sectional views showing a cartridge configuration of Modified Example 4, which has a different cartridge mode from Examples 1 and 2. Also, FIG. 16A shows a state in which a developing built-in drum cartridge 45 and a developing cartridge 46, which will be described later, are combined. FIG. 16B shows a state in which the developing built-in drum cartridge 45 and the developing cartridge 46 are separated from each other.

In the conveyed paper dust storing portion of Examples 1 and 2, an example has been described in which the image forming portion 4 is constituted by a unit consisting of a replaceable drum cartridge 41 and a developing cartridge 42 as a cartridge mode. As the mode of the replaceable unit, it is also possible to use a mode in which the drum cartridge 41 and the developing cartridge 42 are combined and integrated (hereinafter referred to as an integrated drum cartridge). The integrated drum cartridge has the advantage that there is no need to keep multiple units in stock because the replacement units are combined into one unit. On the other hand, when the drum cartridge 41 and the developing cartridge 42 are divided into a plurality of units, it is possible to optimize the lifespan of each unit, which has the advantage of reducing the running cost.

Furthermore, other cartridge modes will be described with reference to FIGS. 16A and 16B. Note that portions held in common with Example 1 are denoted by the same reference numerals and description thereof is omitted.

As shown in FIGS. 16A and 16B, the replaceable unit in Modification 4 is constituted by two units, namely a developing built-in drum cartridge 45 and a developing cartridge 46.

In the developing built-in drum cartridge 45, a photosensitive drum 411, a charging portion 4120, a cleaning portion 4140, a collection portion 415, a transfer roller 413, a developing roller 421, a developing blade 422, and a supply roller 423 are integrally attached to a cartridge frame 450. Note that the charging portion 412 in Example 1 was a charging unit of a corona charging method, but the charging portion 4120 in Modified Example 4 adopted a roller charging method. Also, the cleaning portion 414 in Example 1 was a cleaning member of a roller cleaning method, but the cleaning portion 4140 in Modified Example 4 employs a blade cleaning method. Note that the roller charging method may be employed in the charging unit of the drum cartridge 41 in Examples 1 and 2, and the blade cleaning method may be employed in the cleaning member.

In the developing cartridge 46, a conveyance paddle 424 and a developer storage portion 425 are integrally attached to a developing cartridge frame 460.

A developer receiving port 451 is formed in the cartridge frame 450. Correspondingly, a developer discharge port 461 is formed in the developing cartridge frame 460. As shown in FIG. 16A, when the developing built-in drum cartridge 45 and the developing cartridge 46 are combined with each other, the developer receiving port 451 and the developer discharge port 461 are configured to oppose each other. The developer stored in the developer storage portion 425 is conveyed to the supply roller 423 by the rotation operation of the conveyance paddle 424.

As shown in FIG. 16B, the developing built-in drum cartridge 45 and the developing cartridge 46 are separable from each other. When there is no more developer in the developing cartridge 46, the user replaces the developing cartridge 46 with a new one. The developing cartridge 46 is a simple unit constituted by the conveyance paddle 424, the developer storage portion 425, developer stored therein, and the developer discharge port 461. Accordingly, compared to the developing cartridge 42, the cost can be reduced. Particularly, when images are frequently formed in patterns that require a large amount of developer, the method employing the developing cartridge 46 method is advantageous in terms of the running cost. More specifically, the following cases are conceivable. It is assumed that the amount of developer stored in the developing cartridge 42 is equivalent to 1,000 pages of standard images, and the lifespan of the developing roller 421 is also set to 1,000 pages. If the image to be formed uses five times as much developer as a standard image, the developing cartridge 42 will consume the developer after 200 pages and will need to be replaced. At this time, the developing roller 421 that has not reached the end of its lifespan is also replaced. On the other hand, when the method of the developing cartridge 46 is adopted, the developing roller 421 is disposed in the developing built-in drum cartridge 45, and can be used until the lifespan reaches 1,000 pages.

As shown in FIGS. 16A and 16B, the downstream conveyed paper dust collection portion 417 can be arranged in the same way regardless of the mode of the replaceable unit.

Also, in Modified Example 4 shown in FIGS. 16A and 16B, a paper dust conveying screw 4177, which is a member for conveying paper dust, is provided inside the downstream conveyed paper dust collection portion 417. The paper dust conveying screw 4177 has spiral fins (not shown). The fins are configured such that the directions of the spiral shapes are opposite to each other with the center portion in the left-right direction as a boundary. The paper dust is conveyed outward in the left-right direction by rotationally driving the paper dust conveying screw 4177 using a drive transmitting unit (not shown). By conveying the paper dust in the left-right direction with the paper dust conveying screw 4177, it becomes possible to increase the density of the paper dust collected by the downstream conveyed paper dust collection portion 417. By increasing the density of paper dust, it is possible to improve the amount of paper dust collected by the downstream conveyed paper dust collection portion 417. Also, if the paper dust contains fibers, by conveying the paper dust using the paper dust conveying screw 4177, it is also possible to expect an effect in which the fibers become intertwined with each other and shrinkage progresses, making it difficult to leak to the outside.

As described above, the mode of the replaceable unit in the first and second aspects of the invention can be the drum cartridge 41 and the developing cartridge 42. Also, the mode of the replaceable unit in the first and second aspects of the invention can be an integrated drum cartridge. Furthermore, the mode of the replaceable unit in the first and second aspects of the invention can be the developing built-in drum cartridge 45 and the developing cartridge.

The downstream conveyed paper dust collection portion 417 in the first and second aspects of the invention may also be provided with a paper dust conveying member therein.

As described above, according to this example, even if paper dust is collected by the second conveyance roller 322 and a space is provided to store the collected paper dust, it is possible to reduce the size of the apparatus without influencing the shape of the developing cartridge frame 420.

In the above-described example, an image forming apparatus is described which includes a collection portion 415 as a configuration for removing and collecting paper dust from the photosensitive drum 411, but it is also possible to use an image forming apparatus that does not include the collection portion 415 and includes only the downstream conveyed paper dust collection portion 417.

In the above-described example, a case was described in which the present invention is applied to a so-called monochrome printer including a single image forming portion as the configuration of the image forming apparatus, but the present invention may also be applied to a so-called full-color printer including a plurality of image forming portions. That is, the present invention can be suitably applied to an image forming apparatus in which a full-color image can be formed on a recording material due to the recording material being conveyed so as to sequentially visit a plurality of image forming portions with different colors of developer and developer images of different colors being sequentially transferred thereto in a superimposed manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-100893, filed on Jun. 20, 2023, which is hereby incorporated by reference herein in its entirety.

What is claimed is:

1. An image forming apparatus for forming an image on a recording material comprising:

an apparatus main body having a first conveyance roller; and a cartridge that has a second conveyance roller forming a nip for conveying a recording material with the first conveyance roller, the cartridge configured to be attachable to and detachable from the apparatus main body, wherein the cartridge includes:

a holding portion configured to moveably hold the second conveyance roller in an opposing direction in which the first conveyance roller and the second conveyance roller forming the nip oppose each other;

a removal member configured to remove foreign matter from the second conveyance roller by coming into contact with the second conveyance roller;

a storage portion configured to store the foreign matter removed by the removal member; and a contact member configured to come into contact with the second conveyance roller at a position different from that of the removal member so as to restrict the foreign matter from leaking from the storage portion, wherein the apparatus main body has a biasing member configured to bias the second conveyance roller in a direction toward the first conveyance roller in a case where in which the cartridge is attached to the apparatus main body, wherein the second conveyance roller is at a first position at which the nip is formed by coming into contact with the first conveyance roller due to a biasing force of the biasing member in the case in which the cartridge is attached to the apparatus main body, and is at a second position in a case in which the cartridge is detached from the apparatus main body, and wherein the contact member is in contact with the second conveyance roller in a case in which the second conveyance roller is at the first position and in a case in which the second conveyance roller is at the second position.

2. The image forming apparatus according to claim 1, wherein the removal member is in contact with the second conveyance roller in the case in which the second conveyance roller is at the first position, and is not in contact with the second conveyance roller in the case in which the second conveyance roller is at the second position.

3. A cartridge configured to be attachable to and detachable from an image forming apparatus having a first conveyance roller, comprising:

a second conveyance roller configured to form a nip for conveying a recording material with the first conveyance roller;

a holding portion configured to moveably hold the second conveyance roller in an opposing direction in which the first conveyance roller and the second conveyance roller forming the nip oppose each other;

a removal member configured to remove foreign matter from the second conveyance roller by coming into contact with the second conveyance roller;

a storage portion configured to store the foreign matter removed by the removal member; and a contact member configured to come into contact with the second conveyance roller at a position different from that of the removal member so as to restrict the foreign matter from leaking from the storage portion, wherein the second conveyance roller is at a first position at which the nip is formed by coming into contact with the first conveyance roller in a case in which the cartridge is attached to the apparatus main body, and is at a second position in a case in which the cartridge is detached from the apparatus main body, wherein the contact member is in contact with the second conveyance roller in a case in which the second conveyance roller is at the first position and in a case in which the second conveyance roller is at the second position, and wherein the removal member is in contact with the second conveyance roller in the case in which the second conveyance roller is at the first position, and is not in contact with the second conveyance roller in the case in which the second conveyance roller is at the second position.

* * * * *